(12) United States Patent
Zhang

(10) Patent No.: US 10,082,982 B2
(45) Date of Patent: Sep. 25, 2018

(54) DATA BACKUP METHOD AND APPARATUS, DATA RESTORATION METHOD AND APPARATUS, AND SERVER

(71) Applicant: Huawei Technologies Co., Ltd., Shenzhen (CN)

(72) Inventor: Lei Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 15/479,696

(22) Filed: Apr. 5, 2017

(65) Prior Publication Data

US 2017/0206019 A1    Jul. 20, 2017

Related U.S. Application Data

(63) Continuation of application No. PCT/CN2015/097511, filed on Dec. 15, 2015.

(30) Foreign Application Priority Data

Dec. 22, 2014    (CN) .......................... 2014 1 0810797

(51) Int. Cl.
  *G06F 12/00* (2006.01)
  *G06F 3/06* (2006.01)
  *G06F 11/14* (2006.01)

(52) U.S. Cl.
  CPC .............. *G06F 3/065* (2013.01); *G06F 3/064* (2013.01); *G06F 3/067* (2013.01); *G06F 3/0619* (2013.01);
  (Continued)

(58) Field of Classification Search
  None
  See application file for complete search history.

(56) References Cited

U.S. PATENT DOCUMENTS

| 7,716,438 B2 | 5/2010 | Ushijima et al. |
| 8,281,093 B1 | 10/2012 | Krishnan et al. |

(Continued)

FOREIGN PATENT DOCUMENTS

| CN | 101814044 A | 8/2010 |
| CN | 103019888 A | 4/2013 |

(Continued)

OTHER PUBLICATIONS

Machine Translation and Abstract of Chinese Publication No. CN103699585, Apr. 2, 2014, 27 pages.
Machine Translation and Abstract of Chinese Publication No. CN103902407, Jul. 2, 2014, 17 pages.
Machine Translation and Abstract of Chinese Publication No. CN104166606, Nov. 26, 2014, 34 pages.

(Continued)

*Primary Examiner* — Matthew Bradley
(74) *Attorney, Agent, or Firm* — Conley Rose, P.C.

(57) ABSTRACT

A data backup method and apparatus, a data restoration method and apparatus, and a server are presented. The backup method includes the following steps of obtaining, by a backup server, an original differential bitmap of a first target volume; obtaining valid data in each fixed-length data block from the first target volume according to the original differential bitmap; saving a bitmap corresponding to a fixed-length data block including the valid data to a fixed-length volume bitmap file of the fixed-length data block according to the original differential bitmap; and saving the valid data in the fixed-length data block to a fixed-length volume file of the fixed-length data block. According to the foregoing solution, only valid data is transmitted, an amount of data transmitted between the production end and the server can be reduced, a transmission speed can be increased, and storage space can be saved.

14 Claims, 10 Drawing Sheets

First target volume

| | | | | |
|---|---|---|---|---|
| Address: 0–3 | A | B | N/A | N/A |
| Address: 4–7 | E | N/A | G | N/A |
| Address: 8–11 | I | N/A | N/A | N/A |
| Address: 12–15 | N/A | N/A | N/A | P |

(52) U.S. Cl.
CPC ...... *G06F 11/1451* (2013.01); *G06F 11/1464* (2013.01); *G06F 11/1469* (2013.01); *G06F 2201/815* (2013.01); *G06F 2201/84* (2013.01)

(56) References Cited

U.S. PATENT DOCUMENTS

| | | |
|---|---|---|
| 2005/0223170 A1 | 10/2005 | Ushijima et al. |
| 2010/0023716 A1 | 1/2010 | Nemoto et al. |
| 2010/0077165 A1 | 3/2010 | Lu et al. |
| 2010/0287348 A1 | 11/2010 | Sampathkumar |
| 2012/0290802 A1 | 11/2012 | Wade et al. |

FOREIGN PATENT DOCUMENTS

| | | |
|---|---|---|
| CN | 103064760 A | 4/2013 |
| CN | 103365745 A | 10/2013 |
| CN | 103699585 A | 4/2014 |
| CN | 103902407 A | 7/2014 |
| CN | 104166606 A | 11/2014 |
| CN | 104506619 A | 4/2015 |

OTHER PUBLICATIONS

Machine Translation and Abstract of Chinese Publication No. CN104506619, Apr. 8, 2015, 48 pages.
Foreign Communication From a Counterpart Application, Chinese Application No. 201410810797.1, Chinese Office Action dated Jul. 4, 2017, 5 pages.
Foreign Communication From a Counterpart Application, PCT Application No. PCT/CN2015/097511, English Translation of International Search Report dated Feb. 26, 2016, 2 pages.
Foreign Communication From a Counterpart Application, PCT Application No. PCT/CN2015/097511, English Translation of Written Opinion dated Feb. 26, 2016, 7 pages.
Foreign Communication From a Counterpart Application, European Application No. 15871887.4, Extended European Search Report dated Nov. 9, 2017, 8 pages.
Machine Translation and Abstract of Chinese Publication No. CN101814044, Aug. 25, 2010, 35 pages.
Machine Translation and Abstract of Chinese Publication No. CN103019888, Apr. 3, 2013, 17 pages.
Machine Translation and Abstract of Chinese Publication No. CN103064760, Apr. 24, 2013, 25 pages.
Machine Translation and Abstract of Chinese Publication No. CN103365745, Oct. 23, 2013, 14 pages.

First target volume

| Address: 0–3 | A | B | N/A | N/A |
|---|---|---|---|---|
| Address: 4–7 | E | N/A | G | N/A |
| Address: 8–11 | I | N/A | N/A | N/A |
| Address: 12–15 | N/A | N/A | N/A | P |

FIG. 1

Original bitmap of a first target volume

| Address: 0–3 | 1 | 1 | 0 | 0 |
|---|---|---|---|---|
| Address: 4–7 | 1 | 0 | 1 | 0 |
| Address: 8–11 | 1 | 0 | 0 | 0 |
| Address: 12–15 | 0 | 0 | 0 | 1 |

FIG. 2

Re-calculated bitmap

| Address: 0–3 | 1 |
|---|---|
| Address: 4–7 | 1 |
| Address: 8–11 | 1 |
| Address: 12–15 | 1 |

FIG. 3

Fixed volume file

F_1_Snap_1

| A | B | 0 | 0 |
|---|---|---|---|

F_2_Snap_1

| E | 0 | G | 0 |
|---|---|---|---|

F_3_Snap_1

| I | 0 | 0 | 0 |
|---|---|---|---|

F_4_Snap_1

| 0 | 0 | 0 | P |
|---|---|---|---|

FIG. 4

Volume mapping file

| Address: 0–3 | F_1_Snap_1 |
|---|---|
| Address: 4–7 | F_2_Snap_1 |
| Address: 8–11 | F_3_Snap_1 |
| Address: 12–15 | F_4_Snap_1 |

FIG. 5

First target volume

| | | | | |
|---|---|---|---|---|
| Address: 0–3 | A' | B | C | N/A |
| Address: 4–7 | E | N/A | G | N/A |
| Address: 8–11 | I | N/A | N/A | N/A |
| Address: 12–15 | N/A | N | N/A | P' |

FIG. 6

Original bitmap of a first target volume

| Address | | | | |
|---|---|---|---|---|
| Address: 0–3 | 1 | 0 | 1 | 0 |
| Address: 4–7 | 0 | 0 | 0 | 0 |
| Address: 8–11 | 0 | 0 | 0 | 0 |
| Address: 12–15 | 0 | 1 | 0 | 1 |

FIG. 7

Re-calculated bitmap

| | |
|---|---|
| Address: 0–3 | 1 |
| Address: 4–7 | 0 |
| Address: 8–11 | 0 |
| Address: 12–15 | 1 |

FIG. 8

Fixed-length volume file

F_1_Snap_2

| A' | B | C | 0 |
|---|---|---|---|

F_4_Snap_2

| 0 | N | 0 | P' |
|---|---|---|---|

FIG. 9

Volume mapping file

| Address: 0–3 | F_1_Snap_2 |
| Address: 4–7 | F_2_Snap_1 |
| Address: 8–11 | F_3_Snap_1 |
| Address: 12–15 | F_4_Snap_2 |

| | | | BitMap_F_1_Snap_1 | | | |
|---|---|---|---|---|---|---|
| Address: 0–3 | A | B | 1 | 1 | 0 | 0 |

| | | | BitMap_F_2_Snap_1 | | | |
|---|---|---|---|---|---|---|
| Address: 4–7 | E | G | 1 | 0 | 1 | 0 |

| | | BitMap_F_3_Snap_1 | | | |
|---|---|---|---|---|---|
| Address: 8–11 | I | 1 | 0 | 0 | 0 |

| | | BitMap_F_4_Snap_1 | | | |
|---|---|---|---|---|---|
| Address: 12–15 | P | 0 | 0 | 0 | 1 |

F_1_Snap_2
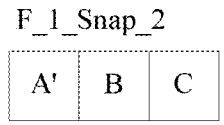
F_4_Snap_2
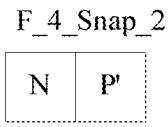
FIG. 16
D_2 volume mapping file
| F_1_Snap_2, storage path 1 |
| F_2_Snap_1, storage path 2 |
| F_3_Snap_1, storage path 3 |
| F_4_Snap_2, storage path 4 |
FIG. 17
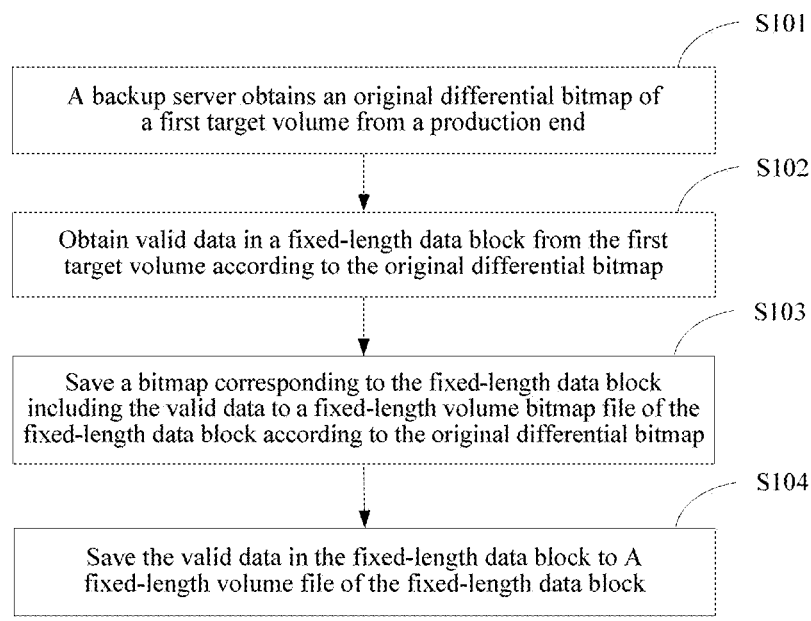
FIG. 18

DATA BACKUP METHOD AND APPARATUS, DATA RESTORATION METHOD AND APPARATUS, AND SERVER

CROSS-REFERENCE TO RELATED APPLICATIONS

This application is a continuation of International Application No. PCT/CN2015/097511, filed on Dec. 15, 2015, which claims priority to Chinese Patent Application No. 201410810797.1, filed on Dec. 22, 2014, both of which are hereby incorporated by reference in their entireties.

TECHNICAL FIELD

This application relates to the communications field, and in particular, to a data backup method and apparatus, a data restoration method and apparatus, and a server.

BACKGROUND

Currently, backup of a physical server and backup of a virtual machine tend to be volume (that is, disk)-based backup. The volume-based backup includes full backup and incremental backup.

When a volume in a to-be-backed-up virtual machine is backed up to a server for a first time, full backup is performed to back up all data in the target volume to the server. In a second time of backup and subsequent backup, differential backup is performed to back up changed data in the target volume to the server.

For convenience of data restoration, a storage format of to-be-backed-up data is usually fixed-length raw volume block data (the to-be-backed-up data is divided into multiple pieces of block data with equal lengths). Both the virtual machine and a volume on the virtual machine are generated on a virtualization platform. The server interacts with the virtualization platform, obtains an original differential bitmap of the target volume on the to-be-backed-up virtual machine from the virtualization platform, and obtains volume data from the virtualization platform according to the original differential bitmap. The server generates, according to the volume data, a volume mapping file corresponding to the volume data, and saves the volume data to corresponding locations as multiple fixed-length volume files according to the volume mapping file. The original differential bitmap is calculated by the virtualization platform using a technology such as changed block tracking (CBT).

An implementation manner of backing up data on the to-be-backed-up virtual machine to the server based on a fixed-length volume data file is performed as following.

It is assumed that a fixed length of a volume on the to-be-backed-up virtual machine is 16 megabytes (MB), each piece of volume data includes four fixed-length data blocks with a fixed length of 4 MB, and each fixed-length data block includes four pieces of data with a granularity of 1 MB. Volume data of a first target volume (storage addresses are 0 to 16) on the to-be-backed-up virtual machine is shown in FIG. 1.

When the server backs up the first target volume on the to-be-backed-up virtual machine for a first time, the first time of backup is full backup.

The server interacts with the virtualization platform, and obtains an original differential bitmap of the first target volume on the to-be-backed-up virtual machine from the virtualization platform. The obtained original differential bitmap is shown in FIG. 2. In the original differential bitmap, "1" is used to identify data in a storage area corresponding to an address in the first target volume as valid data, and "0" is used to identify data in a storage area corresponding to an address in the first target volume as invalid data. The valid data is defined as: The storage area corresponding to the address stores data or data in the storage area corresponding to the address changes. The invalid data is defined as: No data is stored in the storage area corresponding to the address or stored data does not change.

After obtaining the original differential bitmap of the first target volume, the server re-calculates the original differential bitmap to generate a 4-bit bitmap. One bit occupies 4-MB storage space, and the re-generated bitmap is shown in FIG. 3. In the re-generated bitmap, "1" is used to identify that in the original bitmap of the first target volume, a value corresponding to at least one address in an address segment is 1, and this indicates that data stored in the address segment needs to be obtained. In the re-generated bitmap, "0" is used to identify that in the original bitmap of the first target volume, values corresponding to all addresses in an address segment are 0, and this indicates that data stored in the address segment does not need to be obtained.

The server sequentially obtains, from the virtualization platform in ascending order of addresses according to the re-calculated bitmap, volume backup data in locations corresponding to address segments with values of 1 in FIG. 3, divides the data in the first target volume into four fixed-length volume files, saves the four fixed-length volume files, and generates a volume mapping file corresponding to the first target volume. In this case, a size of the backed-up data is 16 MB. In one time of backup, one fixed-length data block is corresponding to one fixed-length volume file, a fixed length of each fixed-length volume file is 4 MB (that is, a size of one fixed-length data block), and the fixed-length volume file is used to identify data that needs to be stored in current backup. Each target volume is corresponding to one volume mapping file, each fixed-length volume file is corresponding to one element in one volume mapping file, each volume mapping file is corresponding to one address segment, and the fixed-length volume file and the volume mapping file are associated using a name of the fixed-length volume file. The saved fixed-length volume files are shown in FIG. 4. F_1_Snap_1 identifies this file as a first fixed-length volume file in the first time of backup. The volume mapping file is shown in FIG. 5. F_1_Snap_1 identifies that storage addresses of the first fixed-length volume file in the first time of backup are 0 to 3.

When the server backs up the first target volume on the to-be-backed-up virtual machine for a second time or subsequently, the second time of backup may be incremental backup.

It is assumed that in this case, the volume data of the first target volume changes, and the server performs incremental backup on the first target volume on the to-be-backed-up virtual machine. The volume data of the first target volume is shown in FIG. 6. Addresses in shadow regions in FIG. 6 identify that data stored in the addresses changes.

The server interacts with the virtualization platform, and obtains, from the virtualization platform, an original differential bitmap of the first target volume on the to-be-backed-up virtual machine relative to latest backup. In this case, the obtained original differential bitmap is shown in FIG. 7. In the original differential bitmap, "1" is used to identify data in a storage area corresponding to an address in the first target volume as valid data, and "0" is used to identify data in a storage area corresponding to an address in the first target volume as invalid data. The valid data is defined as data stored in the storage area corresponding to the address changes. The invalid data is defined as data stored in the storage area corresponding to the address does not change.

After obtaining the original differential bitmap of the first target volume, the server re-calculates the original differential bitmap to generate a 4-bit bitmap. One bit occupies 4-MB storage space, and the re-generated bitmap is shown in FIG. 8.

The server sequentially obtains, from the virtualization platform in ascending order of addresses according to the re-calculated bitmap, volume backup data in locations corresponding to address segments with values of 1 in FIG. 8, divides the data in the first target volume into two fixed-length volume files, saves the two fixed-length volume files. In this case, a size of the backed-up data is 8 MB. The saved fixed-length volume files are shown in FIG. 9. F_1_Snap_2 identifies this file as a first fixed-length volume file in the second time of backup. The volume mapping file is shown in FIG. 10. The volume mapping file in FIG. 10 is formed by combining the volume backup file generated in the first time of backup and the volume mapping file generated in the second time of backup. F_1_Snap_2 identifies that that storage addresses of the first fixed-length volume file in the second time of backup are 0 to 3, and F_2_Snap_1 identifies that storage addresses of a second fixed-length volume file in the first time of backup are 4 to 7.

When data in the first target volume on the virtualization platform is lost, and volume data of the first target volume on the server in the second time of backup needs to be restored to the virtualization platform, the server searches, using backup software, for a volume mapping file that is of the first target volume and that is corresponding to a specific backup time point, obtains a name of each fixed-length volume file from the volume mapping file, opens a corresponding fixed-length volume file, reads all data in the fixed-length volume file, and transmits the data to the virtualization platform, so that the virtualization platform can save the received data to a specified location in the backup software.

However, in the backup and restoration method based on a fixed-length volume data file, because a granularity of one bit in the bitmap re-calculated by the server according to the original differential bitmap of the virtualization platform is 4 MB, when only some data in the fixed-length data block in the first target volume is valid data, the entire fixed-length data block needs to be backed up. For example, relative to the volume data shown in FIG. 1, in the volume data shown in FIG. 6, only data stored in an address 0 and an address 2 in a fixed-length data block corresponding to addresses 0 to 3 changes, and during backup, the fixed-length data block corresponding to the addresses 0 to 3 need to be backed up. Because data (invalid data) that does not change in the fixed-length data block is also backed up to the server during backup, a large amount of data is transmitted between the server and the virtualization platform. Consequently, backup time is increased.

In addition, when the first target volume on the virtualization platform is a thinly configured volume, for space that is not allocated on the virtualization platform, when data in the first target volume on the virtualization platform is backed up to the server, because the volume data is aligned according to a fixed length, invalid data is written into the server. When the data in the first target volume on the server is restored to the virtualization platform, data 0 (the data 0 occupies 1-MB storage space) in the fixed-length volume file is also written into the virtualization platform. Consequently, excessively much space on the virtualization platform is occupied. A feature of the thinly configured volume is storage space allowed to be used is set first, but storage space is allocated according to actual usage.

SUMMARY

This application provides a data backup method and apparatus, a data restoration method and apparatus, and a server, so that only valid data is transmitted, an amount of data transmitted between a production end and a server can be reduced, a transmission speed can be increased, and storage space can be saved.

A first aspect of this application provides a data transmission method, including the following steps: obtaining, by a backup server, an original differential bitmap of a first target volume from a production end, where the first target volume is a to-be-backed-up volume, and the original differential bitmap is an original differential bitmap of all fixed-length data blocks in the first target volume; obtaining valid data in the fixed-length data blocks from the first target volume according to the original differential bitmap; saving a bitmap corresponding to a fixed-length data block including the valid data to a fixed-length volume bitmap file of the fixed-length data block according to the original differential bitmap, where the fixed-length volume bitmap file is used to identify a storage address of the valid data in the first target volume; and saving the valid data in the fixed-length data block to a fixed-length volume file of the fixed-length data block, where the fixed-length volume file and the fixed-length volume bitmap file are in one-to-one correspondence and are saved in association, and the fixed-length volume file is used to store the valid data in current backup.

With reference to the first aspect, in a first possible implementation manner of the first aspect of this application, the method further includes saving a volume mapping file of the first target volume according to the fixed-length volume file, where the volume mapping file includes at least a name of the fixed-length volume file of the fixed-length data block in the first target volume and a storage path of the fixed-length volume file.

With reference to the first aspect or the first possible implementation manner of the first aspect, in a second possible implementation manner of the first aspect of this application, the method further includes obtaining, by the backup server, an incremental bitmap of the first target volume from the production end, where the incremental bitmap is a differential bitmap of a changed fixed-length data block in the first target volume; obtaining valid data in the changed fixed-length data block from the first target volume according to the incremental bitmap; saving a bitmap corresponding to a fixed-length data block including the valid data to a current fixed-length volume bitmap file of the fixed-length data block according to the incremental bitmap; and saving the valid data in the fixed-length data block to a current fixed-length volume file of the fixed-length data block.

With reference to the first possible implementation manner of the first aspect, in a third possible implementation manner of the first aspect of this application, the volume mapping file further includes a name of the fixed-length volume bitmap file corresponding to the fixed-length volume file.

A second aspect of this application provides a data restoration method, where the method includes the following steps: obtaining, by a backup server, a fixed-length volume file and a fixed-length volume bitmap file of a first target volume, where the first target volume is a to-be-restored volume, the first target volume includes multiple fixed-length volume files, the fixed-length volume file and the fixed-length volume bitmap file are in one-to-one correspondence and are saved in association, the fixed-length volume file is used to identify valid data that needs to be stored, and the fixed-length volume bitmap file is used to identify a storage address of the valid data on a production end; and restoring, according to the fixed-length volume file and the fixed-length volume bitmap file, data in the fixed-length volume file to the storage address that is on the production end and that is identified by the fixed-length volume bitmap file.

With reference to the second aspect, in a first possible implementation manner of the second aspect of this application, the fixed-length volume file and the fixed-length volume bitmap file are obtained according to a volume mapping file of the first target volume, and the volume mapping file includes at least a name of a fixed-length volume file of a fixed-length data block in the first target volume and a storage path of the fixed-length volume file.

With reference to the first possible implementation manner of the second aspect, in a second possible implementation manner of the second aspect of this application, the volume mapping file further includes a name of the fixed-length volume bitmap file corresponding to the fixed-length volume file.

A third aspect of this application provides a data backup apparatus, where the apparatus includes a bitmap obtaining module, a volume data obtaining module, a bitmap organization module, and a backup data storage module; the bitmap obtaining module is configured to obtain an original differential bitmap of a first target volume from a production end, where the first target volume is a to-be-backed-up volume, and the original differential bitmap is an original differential bitmap of all fixed-length data blocks in the first target volume; the volume data obtaining module is configured to obtain valid data in the fixed-length data blocks from the first target volume according to the original differential bitmap obtained by the bitmap obtaining module; the bitmap organization module is configured to save a bitmap corresponding to a fixed-length data block including the valid data to a fixed-length volume bitmap file of the fixed-length data block according to the original differential bitmap, where the fixed-length volume bitmap file is used to identify a storage address of the valid data in the first target volume; and the backup data storage module is configured to save the valid data, obtained by the volume data obtaining module, in the fixed-length data block to a fixed-length volume file of the fixed-length data block, where the fixed-length volume file and the fixed-length volume bitmap file are in one-to-one correspondence and are saved in association, and the fixed-length volume file is used to store the valid data in current backup.

With reference to the third aspect, in a first possible implementation manner of the third aspect of this application, the apparatus further includes a volume mapping file generation module, the volume mapping file generation module is configured to save a volume mapping file of the first target volume according to the fixed-length volume file, and the volume mapping file includes at least a name of the fixed-length volume file of the fixed-length data block in the first target volume and a storage path of the fixed-length volume file.

With reference to the third aspect or the first possible implementation manner of the third aspect, in a second possible implementation manner of the third aspect of this application, the bitmap obtaining module is further configured to obtain an incremental bitmap of the first target volume from the production end, and the incremental bitmap is a differential bitmap of a changed fixed-length data block in the first target volume; the volume data obtaining module is further configured to obtain valid data in the changed fixed-length data block from the first target volume according to the incremental bitmap; the bitmap organization module is further configured to save a bitmap corresponding to a fixed-length data block including the valid data to a current fixed-length volume bitmap file of the fixed-length data block according to the incremental bitmap; and the backup data storage module is further configured to save the valid data in the fixed-length data block to a current fixed-length volume file of the fixed-length data block.

With reference to the first possible implementation manner of the third aspect, in a third possible implementation manner of the third aspect of this application, the volume mapping file further includes a name of the fixed-length volume bitmap file corresponding to the fixed-length volume file.

A fourth aspect of this application provides a data backup apparatus, including a memory and a processor, where the memory is configured to store data; the processor is configured to obtain an original differential bitmap of a first target volume from a production end, where the first target volume is a to-be-backed-up volume, and the original differential bitmap is an original differential bitmap of all fixed-length data blocks in the first target volume; the processor is configured to obtain valid data in the fixed-length data blocks from the first target volume according to the original differential bitmap; the processor is configured to save a bitmap corresponding to a fixed-length data block including the valid data to a fixed-length volume bitmap file of the fixed-length data block according to the original differential bitmap, where the fixed-length volume bitmap file is used to identify a storage address of the valid data in the first target volume; and the processor is configured to save the valid data in the fixed-length data block to a fixed-length volume file of the fixed-length data block, where the fixed-length volume file and the fixed-length volume bitmap file are in one-to-one correspondence and are saved in association, and the fixed-length volume file is used to store the valid data in current backup.

With reference to the fourth aspect, in a first possible implementation manner of the fourth aspect of this application, the processor is further configured to save a volume mapping file of the first target volume according to the fixed-length volume file, and the volume mapping file includes at least a name of the fixed-length volume file of the fixed-length data block in the first target volume and a storage path of the fixed-length volume file.

With reference to the fourth aspect or the first possible implementation manner of the fourth aspect, in a second possible implementation manner of the fourth aspect of this application, the processor is further configured to obtain an incremental bitmap of the first target volume from the production end, and the incremental bitmap is a differential bitmap of a changed fixed-length data block in the first target volume; the processor is further configured to obtain valid data in the changed fixed-length data block from the first target volume according to the incremental bitmap; the processor is configured to save a bitmap corresponding to a fixed-length data block including the valid data to a current fixed-length volume bitmap file of the fixed-length data block according to the incremental bitmap; and the processor is configured to save the valid data in the fixed-length data block to a current fixed-length volume file of the fixed-length data block.

With reference to the first possible implementation manner of the fourth aspect, in a third possible implementation manner of the fourth aspect of this application, the volume mapping file further includes a name of the fixed-length volume bitmap file corresponding to the fixed-length volume file.

A fifth aspect of this application provides a data restoration apparatus, where the apparatus includes an obtaining module and a restoration module; the obtaining module is configured to obtain a fixed-length volume file and a fixed-length volume bitmap file of a first target volume, where the first target volume is a to-be-restored volume, the first target volume includes multiple fixed-length volume files, the fixed-length volume file and the fixed-length volume bitmap file are in one-to-one correspondence and are saved in association, the fixed-length volume file is used to identify valid data that needs to be stored, and the fixed-length volume bitmap file is used to identify a storage address of the valid data on a production end; and the restoration module is configured to restore, according to the fixed-length volume file and the fixed-length volume bitmap file, data in the fixed-length volume file to the storage address that is on the production end and that is identified by the fixed-length volume bitmap file.

With reference to the fifth aspect, in a first possible implementation manner of the fifth aspect of this application, the obtaining module is configured to obtain the fixed-length volume file and the fixed-length volume bitmap file according to a volume mapping file of the first target volume, and the volume mapping file includes at least a name of a fixed-length volume file of a fixed-length data block in the first target volume and a storage path of the fixed-length volume file.

With reference to the first possible implementation manner of the fifth aspect, in a second possible implementation manner of the fifth aspect of this application, the volume mapping file further includes a name of the fixed-length volume bitmap file corresponding to the fixed-length volume file.

A sixth aspect of this application provides a data restoration apparatus, where the apparatus includes a memory and a processor; the memory is configured to store data; the processor is configured to obtain a fixed-length volume file and a fixed-length volume bitmap file of a first target volume, where the first target volume is a to-be-restored volume, the first target volume includes multiple fixed-length volume files, the fixed-length volume file and the fixed-length volume bitmap file are in one-to-one correspondence and are saved in association, the fixed-length volume file is used to identify valid data that needs to be stored, and the fixed-length volume bitmap file is used to identify a storage address of the valid data in a production end; and the processor is configured to restore, according to the fixed-length volume file and the fixed-length volume bitmap file, data in the fixed-length volume file to the storage address that is on the production end and that is identified by the fixed-length volume bitmap file.

With reference to the sixth aspect, in a first possible implementation manner of the sixth aspect of this application, the processor is configured to obtain the fixed-length volume file and the fixed-length volume bitmap file according to a volume mapping file of the first target volume, and the volume mapping file includes at least a name of the fixed-length volume file of a fixed-length data block in the first target volume and a storage path of the fixed-length volume file.

With reference to the first possible implementation manner of the sixth aspect, in a second possible implementation manner of the sixth aspect of this application, the volume mapping file further includes a name of the fixed-length volume bitmap file corresponding to the fixed-length volume file.

A seventh aspect of this application provides a server for data backup and restoration, where the server includes the data backup apparatus described above and the data restoration apparatus described above.

In the foregoing solutions, a server obtains an original differential bitmap of a first target volume from a production end, obtains valid data in each fixed-length data block from the first target volume according to the obtained original differential bitmap, saves a bitmap corresponding to a fixed-length data block including the valid data to a fixed-length volume bitmap file of the first target volume, and saves the valid data in the fixed-length data block to a fixed-length volume file of the first target volume. Therefore, only valid data is transmitted, an amount of data transmitted between the production end and the server can be reduced, a transmission speed can be increased, and storage space can be saved.

BRIEF DESCRIPTION OF DRAWINGS

FIG. 1 is a schematic diagram of an implementation manner of a storage format that is of to-be-backed-up volume data and that is based on a fixed-length volume data file;

FIG. 2 shows an original differential bitmap of a to-be-backed-up volume in FIG. 1;

FIG. 3 shows a fixed-length volume bitmap file that is generated by a backup server according to FIG. 2 in a first time of backup;

FIG. 4 is a schematic diagram of an implementation manner of a fixed-length volume file that is generated by a backup server in a first time of backup;

FIG. 5 is a schematic diagram of an implementation manner of a volume mapping file that is generated by a backup server in a first time of backup;

FIG. 6 is a schematic diagram of another implementation manner of a storage format that is of to-be-backed-up volume data and that is based on a fixed-length volume data file;

FIG. 7 shows an original differential bitmap of the to-be-backed-up volume data in FIG. 6 relative to that in FIG. 1;

FIG. 8 shows an original differential bitmap of a to-be-backed-up volume in FIG. 7;

FIG. 9 shows a bitmap that is generated by a backup server according to FIG. 8;

FIG. 16 is a schematic diagram of an implementation manner of a fixed-length volume file that is saved by a server when the server backs up a first target volume for a second time in this application;

FIG. 17 is a schematic diagram of an implementation manner of a volume mapping file that is saved by a server when the server backs up a first target volume for a second time in this application;

FIG. 18 is a flowchart of an implementation manner of a data backup method in this application;

DESCRIPTION OF EMBODIMENTS

In the following description, to illustrate rather than limit, specific details such as a particular system structure, an interface, and a technology are provided to make a thorough understanding of this application.

Figures 10, 11, 12:
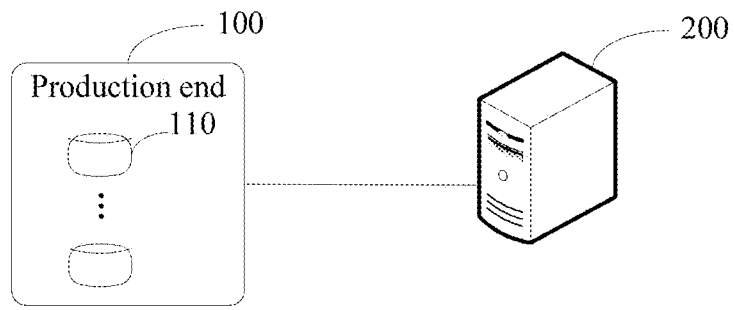
FIG. 10 is a schematic diagram of an implementation manner of a fixed-length volume mapping file that is generated by a backup server in a second time of backup.
FIG. 11 is a schematic structural diagram of an implementation manner of a data backup and restoration system in this application.
FIG. 12 is a schematic diagram of an implementation manner of a fixed-length volume bitmap file that is saved by a server when the server backs up a first target volume for a first time in this application.

Referring to FIG. 11, FIG. 11 is a schematic structural diagram of an implementation manner of a data backup and restoration system in this application. In this implementation manner, the system includes a production end 100 and a backup end 200.

The production end 100 is a to-be-backed-up virtual machine or physical server, and the backup end 200 is a server. The production end 100 includes at least one to-be-backed-up volume 110, volume data of the to-be-backed-up volume 110 includes multiple aligned fixed-length data blocks, the fixed-length data blocks occupy same storage space, and different fixed-length data blocks are corresponding to mutually different storage address segments.

Both the production end 100 and the to-be-backed-up volume 110 on the production end 100 are generated on a virtualization platform (not shown in the figure). Backup software is installed on the server 200, so that backup and restoration functions can be implemented. When the production end 100 backs up data in the to-be-backed-up volume 110 onto the server 200, the server 200 interacts with the virtualization platform, to back up and restore the volume data.

In an example of this implementation manner, the production end 100 includes one to-be-backed-up volume 110 (the to-be-backed-up volume is a target volume), but the example is not limited thereto. In another implementation manner, the production end 100 may include two or more to-be-backed-up volumes.

When backing up volume data of a first target volume 110 on the production end 100 for a first time, the server 200 needs to perform full backup on the volume data of the first target volume 110.

Referring to FIG. 1 and FIG. 2, FIG. 1 is a schematic diagram of an implementation manner of a storage format that is of to-be-backed-up volume data and that is based on a fixed-length volume data file, and FIG. 2 shows an original differential bitmap of a to-be-backed-up volume in FIG. 1.

Volume data shown in FIG. 1 is original volume data of a first target volume 110. A fixed length of the first target volume 110 is 16 M, and the first target volume 110 includes four 4-M (a quantity and a size are not limited thereto, and may be set to other values according to actual needs) fixed-length data blocks. A first fixed-length data block is stored at storage addresses 0 to 3, a second fixed-length data block is stored at storage addresses 4 to 7, a third fixed-length data block is stored at storage addresses 8 to 11, and a fourth fixed-length data block is stored at storage addresses 12 to 15.

In the original differential bitmap shown in FIG. 2, "1" is used to identify data in a storage area corresponding to an storage address in the first target volume 110 as valid data, and "0" is used to identify data in a storage area corresponding to an storage address in the first target volume 110 as invalid data. The valid data is defined as: the storage area corresponding to the storage address stores data or data in the storage area corresponding to the storage address changes. The invalid data is defined as: no data is stored in the storage area corresponding to the storage address or stored data does not change.

A server 200 obtains the original differential bitmap of the first target volume 110 from a production end 100. The production end 100 is a to-be-backed-up virtual machine or physical server, the first target volume 110 is a to-be-backed-up volume, and the original differential bitmap is an original differential bitmap of all fixed-length data blocks in the first target volume 110.

For example, when receiving a backup instruction, the server 200 obtains information about the to-be-backed-up volume from the backup instruction, allocates storage space to the to-be-backed-up volume, and creates a volume mapping file, a fixed-length volume file, and a fixed-length volume bitmap file of the to-be-backed-up volume on preset storage paths. The backup instruction includes a name of the to-be-backed-up volume, and the information about the to-be-backed-up volume includes a quantity of fixed-length volumes, a size of the fixed-length volume, or the like. A corresponding volume mapping file, a corresponding fixed-length volume file, and a corresponding fixed-length volume bitmap file are created during backup each time. The fixed-length volume file and the fixed-length volume bitmap file are in one-to-one correspondence and are saved in association. The volume mapping file includes at least a name of a fixed-length volume file of the fixed-length data block in the first target volume and a storage path of the fixed-length volume file.

It is assumed that the to-be-backed-up volume obtained by the server 200 from the backup instruction is the first target volume 110, the first target volume 110 includes four fixed-length data blocks, storage space allocated by the server 200 to the first target volume 110 is a disk D, and the server 200 creates a volume mapping file, fixed-length volume files, and fixed-length volume bitmap files in a directory of the disk D. There are four fixed-length volume files and four fixed-length volume bitmap files.

A name of the volume mapping file is D_M volume mapping file (but the name is not limited thereto, and may be another name), a storage path is DA, the D_M volume mapping file is used to store a name of a fixed-length volume file corresponding to each fixed-length data block in the first target volume 110 in an $M^{th}$ time of backup. M>0, and M is a natural number. A name of the fixed-length volume file is F_N_Snap_M, a storage address of the fixed-length volume file is DAF, and the fixed-length volume file is used to identify that valid data in an $N^{th}$ fixed-length data block in the $M^{th}$ time of backup is stored in a sub-folder F_N_Snap_M of a folder F in a directory of the volume D. A name of the fixed-length volume bitmap file is BitMap_F_N_Snap_M, a storage address of the fixed-length volume bitmap file is DAB, and the fixed-length volume bitmap file is used to identify that a bitmap file of the $N^{th}$ fixed-length data block in the $M^{th}$ time of backup is stored in a sub-folder BitMap_F_N_Snap_M of a folder B in the directory of the volume D. It may be understood that the storage path of the fixed-length volume file may be the same as or may be different from the storage path of the fixed-length volume bitmap file, and this is not limited herein. N>0, and N is a natural number.

The fixed-length volume file and the fixed-length volume bitmap file are in one-to-one correspondence and are saved in association, and N and M in the name of the fixed-length volume file are respectively equal to N and M in the name of the fixed-length volume bitmap file.

It may be understood that, in this implementation manner, a fixed-length volume file and a fixed-length volume bitmap file are created when a fixed-length data block including valid data is obtained. In another implementation manner, the fixed-length volume file and the fixed-length volume bitmap file may be created at another time point. A time of creating the fixed-length volume file and the fixed-length volume bitmap file is not limited herein. The server 200 may create the fixed-length volume file and the fixed-length volume bitmap file when receiving the backup instruction or when obtaining the valid data in the fixed-length data block. Preset storage paths of the volume mapping file, the fixed-length volume file, and the fixed-length volume bitmap file may be set according to actual needs.

When the server 200 backs up the first target volume 110 on the production end 100 for the first time, the server creates, on preset storage paths, a volume mapping file, fixed-length volume files, and fixed-length volume bitmap files of the to-be-backed-up volume in the first time of backup. A name of the created volume mapping file in the first time of backup is D_1 volume mapping file. The fixed-length volume files created in a directory of the D_1 volume mapping file include a first fixed-length volume F_1_Snap_1, F_2_Snap_1, F_3_Snap_1, and F_4_Snap_1, and the created fixed-length volume bitmap files include BitMap_F_1_Snap_1, BitMap_F_2_Snap_1, BitMap_F_3_Snap_1, and BitMap_F_4_Snap_1.

The server 200 interacts with a virtualization platform, and obtains an original differential bitmap of the first target volume 110 in the first time of backup from the production end 100 using the virtualization platform. The original differential bitmap of the first target volume 110 is automatically generated when the production end 100 detects that volume data of the first target volume 110 changes, and the original differential bitmap includes the original differential bitmap of all the fixed-length data blocks in the first target volume 110.

The server 200 obtains valid data in the fixed-length data blocks from the first target volume 110 according to the original differential bitmap, and saves a bitmap corresponding to a fixed-length data block including the valid data to a fixed-length volume bitmap file of the fixed-length data block according to the original differential bitmap. The fixed-length data block including the valid data is in one-to-one correspondence with the fixed-length volume bitmap file, and the fixed-length volume bitmap file is used to identify a storage address of the valid data in the first target volume 110.

For example, after obtaining the original differential bitmap of the first target volume 110, the server 200 sequentially detects, in ascending order of storage addresses, values corresponding to the storage addresses, to determine whether a storage address segment corresponding to each fixed-length data block has valid data that needs to be obtained. It may be understood that, in another implementation manner, the server 200 may sequentially detect, in descending order of storage addresses, values corresponding to the storage addresses, or may randomly detect a value corresponding to each storage address in a storage address segment corresponding to any fixed-length data block, and this is not limited herein, provided that values corresponding to all storage addresses corresponding to the volume data of the first target volume 110 can be detected.

When detecting that a value corresponding to any storage address in the original differential bitmap is 1, the server 200 determines that a storage area corresponding to the storage address stores valid data that needs to be obtained. The server 200 separately obtains the valid data in the fixed-length data blocks in sequence using the fixed-length data block as a basic unit.

The server 200 determines that valid data included in the first fixed-length data block, the second fixed-length data block, the third fixed-length data block, and the fourth fixed-length data block needs to be obtained.

The valid data obtained by the server 200 from the first fixed-length data block is A and B, the valid data obtained from the second fixed-length data block is E and G, the valid data obtained from the third fixed-length data block is I, and the valid data obtained from the fourth fixed-length data block is P.

After obtaining the valid data included in the fixed-length data block, the server 200 saves the bitmap corresponding to the fixed-length data block including the valid data to a pre-created fixed-length volume bitmap file of the fixed-length data block according to the original differential bitmap. One fixed-length data block including valid data is corresponding to one fixed-length volume bitmap file, and the fixed-length volume bitmap file is used to identify the storage address of the valid data in the first target volume 110.

For example, after obtaining the valid data included in the fixed-length data blocks, the server 200 saves, in a form of a file according to the original differential bitmap, a bitmap corresponding to the first fixed-length data block to a sub-folder BitMap_F_1_Snap_1 whose storage path is DAB, to identify that a first fixed-length volume bitmap file of the first target volume 110 is stored in the sub-folder BitMap_F_1_Snap_1 of the folder B in the directory of the volume D. The BitMap_F_1_Snap_1 identifies that a storage address, in the first target volume 110 on the production end 100, of the first piece of valid data in the first fixed-length data block is 0 and a storage address, in the first target volume 110 on the production end 100, of the second piece of valid data in the first fixed-length data block is 1.

The server 200 saves, in a form of a file, a bitmap corresponding to the second fixed-length data block to a sub-folder BitMap_F_2_Snap_1 whose storage path is DAB, to identify that a second fixed-length volume bitmap file of the first target volume 110 is stored in the sub-folder BitMap_F_2_Snap_1 of the folder B in the directory of the volume D. The BitMap_F_2_Snap_1 identifies that a storage address, in the first target volume 110 on the production end 100, of the first piece of valid data in the second fixed-length data block is 4 and a storage address, in the first target volume 110 on the production end 100, of the second piece of valid data in the second fixed-length data block is 6.

The server 200 saves, in a form of a file, a bitmap corresponding to the third fixed-length data block to a sub-folder BitMap_F_3_Snap_1 whose storage path is DAB, to identify that a third fixed-length volume bitmap file of the first target volume 110 is stored in the sub-folder BitMap_F_3_Snap_1 of the folder B in the directory of the volume D. The BitMap_F_3_Snap_1 identifies that a storage address, in the first target volume 110 on the production end 100, of the first piece of valid data in the third fixed-length data block is 8.

The server 200 saves, in a form of a file, a bitmap corresponding to the fourth fixed-length data block to a sub-folder BitMap_F_4_Snap_1 whose storage path is DAB, to identify that a fourth fixed-length volume bitmap file of the first target volume 110 is stored in the sub-folder BitMap_F_4_Snap_1 of the folder B in the directory of the volume D. The BitMap_F_4_Snap_1 identifies that a storage address, in the first target volume 110 on the production end 100, of the first piece of valid data in the fourth fixed-length data block is 15.

As shown in FIG. 12, FIG. 12 is a schematic diagram of an implementation manner of a fixed-length volume bitmap file that is saved by a server when the server backs up a first target volume for a first time in this application.

In the first time of backup, a fixed-length volume bitmap file corresponding to a first fixed-length data block is a first fixed-length volume bitmap file, and a name is BitMap_F_1_Snap_1. The first fixed-length volume bitmap file is used to identify that when a server 200 restores data in the first time of backup to a production end 100, the first piece of valid data A in the first fixed-length data block needs to be saved to a storage area corresponding to a storage address 0 on the production end 100, and the second piece of valid data B in the first fixed-length data block needs to be saved to a storage area corresponding to a storage address 1 on the production end 100.

A fixed-length volume bitmap file corresponding to a second fixed-length data block is a second fixed-length volume bitmap file, and a name is BitMap_F_2_Snap_1. The second fixed-length volume bitmap file is used to identify that when the server 200 restores the data in the first time of backup to the production end 100, the first piece of valid data E in the second fixed-length data block needs to be saved to a storage address 4 on the production end 100, and the second piece of valid data G in the second fixed-length data block needs to be saved to a storage area corresponding to a storage address 6 on the production end 100.

A fixed-length volume bitmap file corresponding to a third fixed-length data block is a third fixed-length volume bitmap file, and a name is BitMap_F_3_Snap_1. The third fixed-length volume bitmap file is used to identify that when the server 200 restores the data in the first time of backup to the production end 100, valid data I in the third fixed-length data block needs to be saved to a storage area corresponding to a storage address 8 on the production end 100.

A fixed-length volume bitmap file corresponding to a fourth fixed-length data block is a fourth fixed-length volume bitmap file, and a name is BitMap_F_4_Snap_1. The fourth fixed-length volume bitmap file is used to identify that when the server 200 restores the data in the first time of backup to the production end 100, valid data P in the fourth fixed-length data block needs to be saved to a storage area corresponding to a storage address 15 on the production end 100.

The server 200 saves the valid data in the fixed-length data block to a fixed-length volume file of the first target volume. One fixed-length data block is corresponding to one fixed-length volume file, the fixed-length volume file and the fixed-length volume bitmap file are in one-to-one correspondence and are saved in association, and the fixed-length volume file is used to store the valid data in the current backup.

Figure 13:
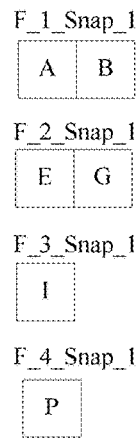
FIG. 13 is a schematic diagram of an implementation manner of a fixed-length volume file that is saved by a server when the server backs up a first target volume for a first time in this application.

For example, after obtaining the valid data in the fixed-length data blocks, and saving bitmaps corresponding to the fixed-length data blocks that include the valid data to the fixed-length volume bitmap files of the first target volume 110, the server 200 saves the obtained valid data in the fixed-length data blocks to pre-created fixed-length volume files. One fixed-length volume file is corresponding to one fixed-length volume bitmap file, the fixed-length volume file and the fixed-length volume bitmap file are saved in association, and the fixed-length volume file is used to identify the valid data in the current backup. As shown in FIG. 13, FIG. 13 is a schematic diagram of an implementation manner of a fixed-length volume file that is saved by a server when the server backs up a first target volume for a first time in this application.

The server 200 sequentially saves the first piece of valid data A and the second piece of valid data B in the first fixed-length data block to a sub-folder F_1_Snap_1 whose storage path is DAF. F_1_Snap_1 is a first fixed-length volume file, and identifies that the valid data in the first fixed-length data block is stored in the sub-folder F_1_Snap_1 of a folder F in a directory of a volume D.

The server 200 sequentially saves the first piece of valid data E and the second piece of valid data G in the second fixed-length data block to a sub-folder F_2_Snap_1 under DAF. F_2_Snap_1 is the second fixed-length volume file, and identifies that the valid data in the second fixed-length data block is stored in the sub-folder F_2_Snap_1 of the folder F in the directory of the volume D.

The server 200 saves the valid data I in the third fixed-length data block to a sub-folder F_3_Snap_1 under DAF. F_3_Snap_1 is the third fixed-length volume file, and identifies that the valid data in the third fixed-length data block is stored in the sub-folder F_3_Snap_1 of the folder F in the directory of the volume D.

The server 200 saves the valid data P in the fourth fixed-length data block to a sub-folder F_4_Snap_1 under D:\F. F_4_Snap_1 is a fourth fixed-length volume file, and identifies that the valid data in the fourth fixed-length data block is stored in the sub-folder F_4_Snap_1 of the folder F in the directory of the volume D.

In this implementation manner, each time the server 200 obtains valid data in a fixed-length data block, the server 200 saves a bitmap corresponding to the fixed-length data block including the valid data to a fixed-length volume bitmap file of the fixed-length data block, and saves the obtained valid data in the fixed-length data block to a fixed-length volume file corresponding to the fixed-length data block. This process is repeated until valid data in all fixed-length data blocks in the first target volume 110 is saved to respective corresponding fixed-length volume files.

In another implementation manner, the server may save, after obtaining valid data in all fixed-length data blocks in the first target volume 110, a bitmap corresponding to each fixed-length data block including the valid data to a fixed-length volume bitmap file corresponding to the fixed-length data block, and save the obtained valid data in the fixed-length data block to a fixed-length volume file corresponding to the fixed-length data block.

Optionally, after saving the valid data in all the fixed-length data blocks to the respective corresponding fixed-length volume files in the first time of backup, the server 200 saves a volume mapping file of the first target volume according to the fixed-length volume files. A corresponding volume mapping file, a corresponding fixed-length volume file, and a corresponding fixed-length volume bitmap file are generated during backup each time. The fixed-length volume file and the fixed-length volume bitmap file are in one-to-one correspondence and are saved in association. The volume mapping file includes at least a name of the fixed-length volume file of the fixed-length data block of the first target volume 110 and a storage path of the fixed-length volume file. When the server 200 needs to restore the volume data of the first target volume 110 to the production end 100, the volume mapping file is used to direct the server 200 to search for a fixed-length volume file corresponding to each fixed-length data block and search for data in each fixed-length volume file according to a storage path of the fixed-length volume file. The name of the fixed-length volume file and the storage path of the fixed-length volume file are in one-to-one correspondence and are saved in association.

Optionally, the volume mapping file further includes a name of the fixed-length volume bitmap file corresponding to the fixed-length volume file. The name of the fixed-length volume file, the storage path of the fixed-length volume file, and the name of the fixed-length volume bitmap file are in one-to-one correspondence and are saved in association.

Figure 14:
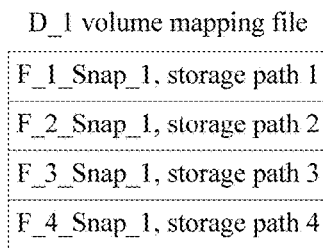
FIG. 14 is a schematic diagram of an implementation manner of a volume mapping file that is saved by a server when the server backs up a first target volume for a first time in this application.

As shown in FIG. 14, FIG. 14 is a schematic diagram of an implementation manner of a volume mapping file that is saved by a server when the server backs up a first target volume for a first time in this application.

For example, each time the server 200 saves a fixed-length volume file in the first time of backup, the server 200 saves a file name of the fixed-length volume file and a storage path of the fixed-length volume file in association to a pre-created volume mapping file of the first target volume until names and storage paths of all fixed-length volume files are saved to the volume mapping file. The volume mapping file includes at least the name of the fixed-length volume file and the storage path of the fixed-length volume file.

The name of the fixed-length volume file is used, so that when data on the server 200 is restored to the production end 100, the server 200 can search, according to the name of the fixed-length volume file, for the fixed-length volume file corresponding to the name of the fixed-length volume file, and the fixed-length volume bitmap file that is saved in association with the fixed-length volume file, and obtain, according to the storage path of the fixed-length volume file, data included in the fixed-length volume file. The fixed-length volume bitmap file is used to identify a storage address that is on the production end 100 and to which the data included in the fixed-length volume file needs to be transmitted.

The volume mapping file identifies that the first fixed-length volume file F_1_Snap_1 in the first time of backup is stored in a location corresponding to a storage path 1, and the first fixed-length volume file F_1_Snap_1 is corresponding to the first fixed-length data block that is stored in a storage address segment 0-3 on the production end 100; the second fixed-length volume file F_2_Snap_1 in the first time of backup is stored in a location corresponding to a storage path 2, and the second fixed-length volume file F_2_Snap_1 is corresponding to the second fixed-length data block that is stored in a storage address segment 4-7 on the production end 100; the third fixed-length volume file F_3_Snap_1 in the first time of backup is stored in a location corresponding to a storage path 3, and the third fixed-length volume file F_3_Snap_1 is corresponding to the third fixed-length data block that is stored in a storage address segment 8-11 on the production end 100; and the fourth fixed-length volume file F_4_Snap_1 in the first time of backup is stored in a location corresponding to a storage path 4, and the fourth fixed-length volume file F_4_Snap_1 is corresponding to the fourth fixed-length data block that is stored in a storage address segment 12-15 on the production end 100.

Optionally, the volume mapping file further includes a name of the fixed-length volume bitmap file corresponding to the fixed-length volume file. The name of the fixed-length volume file, the storage path of the fixed-length volume file, and the name of the fixed-length volume bitmap file are in one-to-one correspondence and are saved in association. The name of the fixed-length volume file is used for searching for the fixed-length volume file corresponding to the name of the fixed-length volume file, the storage path of the fixed-length volume file is used to identify a storage location of the fixed-length volume file, and the name of the fixed-length volume bitmap file is used for searching for the fixed-length volume bitmap file corresponding to the name of the fixed-length volume bitmap file.

When the volume data of the first target volume 110 changes, and the server 200 backs up the volume data of the first target volume 110 on the production end 100 for an $N^{th}$ ($N \geq 2$) time, the server 200 needs to perform incremental backup on the volume data of the first target volume 110, and a same manner is used for incremental backup each time. The following is described using a second time of backup as an example.

A difference between the second time of backup and the first time of backup that are performed by the server 200 on the first target volume 110 lies in that a differential bitmap obtained by the server 200 is an original differential bitmap of the first target volume 110 relative to that in the first time of backup, that is, an incremental bitmap of to-be-backed-up volume data; and the server 200 obtains, from the first target volume 110 according to the incremental bitmap, valid data in a changed fixed-length data block and a bitmap corresponding to the valid data. The valid data is valid data included in the changed fixed-length data block in the current backup, and is obtained by combining changed data (incremental data) in the current backup with valid data in previous backup.

Referring to FIG. 6 and FIG. 7, FIG. 6 is a schematic diagram of another implementation manner of a storage format that is of to-be-backed-up volume data and that is based on a fixed-length volume data file, and FIG. 7 shows an original differential bitmap of the to-be-backed-up volume data in FIG. 6 relative to that in FIG. 1. Volume data shown in shadow regions in FIG. 6 is changed volume data in a first target volume 110, and data stored in storage areas corresponding to storage addresses 0, 3, 13, and 15 changes. The original differential bitmap shown in FIG. 7 is an original differential bitmap of the volume data in FIG. 6 relative to volume data in the first time of backup in FIG. 1, that is, an incremental bitmap of the to-be-backed-up volume data. "1" is used to identify that data in a storage area corresponding to an storage address changes, and the changed data is valid data.

A server 200 obtains an incremental bitmap of the first target volume 110 from a production end, and the incremental bitmap is a differential bitmap of a changed fixed-length data block in the first target volume 100.

For example, when receiving a backup instruction for an $N^{th}$ (N≥2, and in this case, N=2) time of backup, the server 200 creates, on preset storage paths, a volume mapping file, fixed-length volume files, and fixed-length volume bitmap files of a to-be-backed-up volume in the second time of backup. A name of the created volume mapping file in the second time of backup is D_2 volume mapping file. The fixed-length volume files created in a directory of the D_2 volume mapping file include a first fixed-length volume F_1_Snap_2, F_2_Snap_2, F_3_Snap_2, and F_4_Snap_2, and the created fixed-length volume bitmap files include BitMap_F_1_Snap_2, BitMap_F_2_Snap_2, BitMap_F_3_Snap_2, and BitMap_F_4_Snap_2. The volume mapping file includes at least names of fixed-length volume files of all fixed-length data blocks in the first target volume 100 and storage paths of the fixed-length volume files. The fixed-length volume file and the fixed-length volume bitmap file are in one-to-one correspondence and are saved in association.

The server 200 interacts with a virtualization platform, and obtains an incremental bitmap of the first target volume 110 in the second time of backup from the production end 100 using the virtualization platform. The incremental bitmap of the first target volume 110 is automatically generated when the production end 100 detects that volume data of the first target volume 110 changes, and the incremental bitmap includes a differential bitmap of all changed fixed-length data blocks in the first target volume 110.

The incremental bitmap, obtained by the server 200, of the first target volume 110 in the second time of backup includes an incremental bitmap BitMap_F 1 of a first fixed-length data block and an incremental bitmap BitMap_F 4 of a fourth fixed-length data block.

BitMap_F 1 is used to identify that on the production end 100, the first piece of valid data A' in the first fixed-length data block is stored in a storage area corresponding to a storage address 0, and the second piece of valid data C in the first fixed-length data block is stored in a storage area corresponding to a storage address 2.

BitMap_F 4 is used to identify that on the production end 100, the first piece of valid data N in the fourth fixed-length data block is stored in a storage area corresponding to a storage address 13, and the second piece of valid data P' in the fourth fixed-length data block is stored in a storage area corresponding to a storage address 15.

The server 200 obtains valid data in the changed fixed-length data block from the first target volume 110 according to the incremental bitmap.

For example, after obtaining the incremental bitmap of the first target volume 110, the server 200 sequentially detects, in ascending order of storage addresses, values corresponding to the storage addresses, to determine whether a storage address segment corresponding to each fixed-length data block has valid data that needs to be obtained. It may be understood that, in another implementation manner, the server 200 may sequentially detect, in descending order of storage addresses, values corresponding to the storage addresses, or may randomly detect a value corresponding to each storage address in a storage address segment corresponding to any fixed-length data block, and this is not limited herein, provided that values corresponding to all storage addresses corresponding to the volume data of the first target volume 110 can be detected. When detecting that a value corresponding to any storage address in the incremental bitmap is 1, the server 200 determines that a storage area corresponding to the storage address stores valid data that needs to be obtained. The server 200 separately obtains valid data in changed fixed-length data blocks in sequence using the fixed-length data block as a basic unit.

The server 200 determines that data in the first fixed-length data block and data in the fourth fixed-length data block change, and need to obtain valid data in the first fixed-length data block and valid data in the fourth fixed-length data block. The valid data obtained by the server 200 from the changed first fixed-length data block is A' and C, and the valid data obtained from the fourth fixed-length data block is N and P'.

The server 200 saves a bitmap corresponding to the fixed-length data block including the valid data to a current fixed-length volume bitmap file of the fixed-length data block according to the incremental bitmap. The current fixed-length volume bitmap file is a fixed-length volume bitmap file in the $N^{th}$ time of backup.

For example, the server 200 obtains, from locally stored fixed-length volume bitmap files in the first time of backup according to the incremental bitmap, a fixed-length volume bitmap file that is in an $(N-1)^{th}$ time of backup and corresponding to the fixed-length data block including the valid data, combines an incremental bitmap, corresponding to each fixed-length data block including the valid data, in the $N^{th}$ time of backup and a fixed-length volume bitmap file, corresponding to the fixed-length data block including the valid data, in the $(N-1)^{th}$ time of backup, and saves a bitmap obtained after combination to a current fixed-length volume bitmap file of the fixed-length data block, to obtain a fixed-length volume bitmap file in the $N^{th}$ time of backup.

Figure 15:
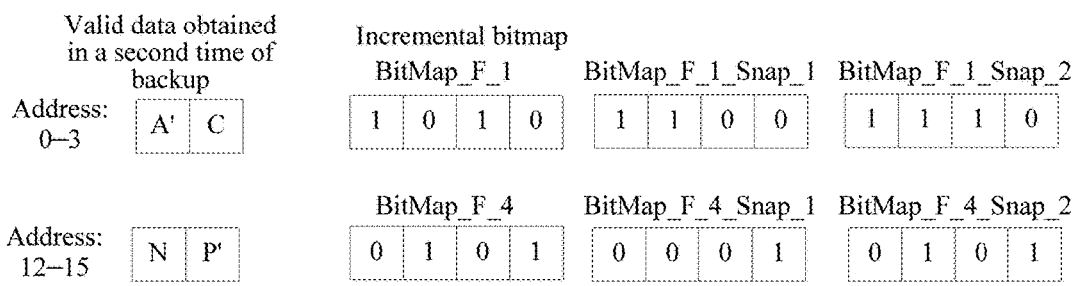
FIG. 15 is a schematic diagram of a fixed-length volume bitmap file that is saved by a backup server when the backup server backs up a first target volume for a second time in this application.

As shown in FIG. 15, FIG. 15 is a schematic diagram of a fixed-length volume bitmap file that is generated by a backup server in a second time of backup in this application.

The server 200 obtains, from the locally stored fixed-length volume bitmap files in the first time of backup according to the incremental bitmap BitMap_F_1 of the first fixed-length data block including the valid data, a fixed-length volume bitmap file BitMap_F_1_Snap_1 corresponding to the first fixed-length data block, performs "OR" operation on an incremental bitmap BitMap_F_1 corresponding to the first fixed-length data block in the second time of backup and the fixed-length volume bitmap file BitMap_F_1_Snap_1 in the first time of backup, and saves a bitmap obtained after combination to a current fixed-length volume bitmap file of the first fixed-length data block, to obtain a fixed-length volume bitmap file BitMap_F_1_Snap_2 corresponding to the first fixed-length data block in the second time of backup.

The server 200 obtains, from the locally stored fixed-length volume bitmap files in the first time of backup according to the incremental bitmap BitMap_F_4 of the fourth fixed-length data block including the valid data, a fixed-length volume bitmap file BitMap_F_4_Snap_1 corresponding to the fourth fixed-length data block, performs "OR" on and combines an incremental bitmap BitMap_F_4 corresponding to the fourth fixed-length data block in the second time of backup and the fixed-length volume bitmap file BitMap_F_4_Snap_1 in the first time of backup, and saves a bitmap obtained after combination to a current fixed-length volume bitmap file of the fourth fixed-length data block, to obtain a fixed-length volume bitmap file BitMap_F_4_Snap_2 corresponding to the fourth fixed-length data block in the second time of backup.

The server 200 saves the valid data in the fixed-length data block to a current fixed-length volume file of the fixed-length data block.

For example, after obtaining the fixed-length volume bitmap file, in the $N^{th}$ (N≥2, and in this case, N=2) time of backup, of the fixed-length data block including the valid data, the server 200 compares an incremental bitmap of the fixed-length data block in the $N^{th}$ time of backup and the fixed-length volume bitmap file of the fixed-length data block in the $N^{th}$ time of backup, to determine whether the incremental bitmap in the $N^{th}$ time of backup is the same as the fixed-length volume bitmap file in the $N^{th}$ time of backup. A determining method is determining whether same storage addresses are corresponding to a same value.

When determining that the incremental bitmap of the fixed-length data block in the current backup is the same as the fixed-length volume bitmap file of the fixed-length data block, the server 200 saves the obtained valid data in the changed fixed-length data block to the current fixed-length volume file of the fixed-length data block, to obtain the fixed-length volume file corresponding to the fixed-length data block in the $N^{th}$ time of backup.

When determining that the incremental bitmap of the fixed-length data block in the current backup is different from the fixed-length volume bitmap file of the fixed-length data block, the server 200 obtains, from a locally stored fixed-length volume file in the $(N-1)^{th}$ time of backup, valid data corresponding to storage addresses with different values.

Then, the obtained valid data in the changed fixed-length data block and the valid data that is obtained from the fixed-length volume file in the $(N-1)^{th}$ time of backup are sequentially saved to a current fixed-length volume file of the fixed-length data block according to a sequence of storage addresses, to obtain a fixed-length volume file corresponding to the fixed-length data block in the $N^{th}$ time of backup.

As shown in FIG. 16, FIG. 16 is a schematic diagram of an implementation manner of a fixed-length volume file that is saved by a server when the server backs up a first target volume for a second time in this application.

Valid data stored in the current fixed-length volume file of the first fixed-length data block is A', B, and C, and A' and C are valid data obtained in the $N^{th}$ time of backup from the changed fixed-length data block, and B is valid data obtained from the fixed-length volume file that is saved in the $(N-1)^{th}$ time of backup.

Valid data stored in the current fixed-length volume file of the fourth fixed-length data block is N and P', and N and P' are valid data obtained in the $N^{th}$ time of backup from the changed fixed-length data block.

It may be understood that the valid data is data stored in the changed fixed-length data block in the current backup, and includes changed data in the current backup and valid data in previous backup. In this implementation manner, an incremental bitmap of the first fixed-length data block in the current backup is different from the fixed-length volume bitmap file of the first fixed-length data block, and an incremental bitmap of the fourth fixed-length data block in the current backup is the same as the fixed-length volume bitmap file of the fourth fixed-length data block.

In this implementation manner, when determining that an incremental bitmap of a fixed-length data block in the current backup is different from a fixed-length volume bitmap file of the fixed-length data block, the backup server obtains valid data corresponding to storage addresses with different values from the locally stored fixed-length volume file in the $(N-1)^{th}$ time of backup. In another implementation manner, the backup server may directly obtain the valid data corresponding to the storage addresses with different values from the first target volume 110 on the production end 100. In this case, a transmission channel between the production end 100 and the server 200 may be occupied and a transmission rate is relatively low.

Optionally, after obtaining a fixed-length volume file saved in the second time of backup, the server 200 saves a file name of the fixed-length volume file and a storage path of the fixed-length volume file in association to a pre-created volume mapping file of the first target volume until names and storage paths of all fixed-length volume files are saved to the volume mapping file. The volume mapping file includes at least the name of the fixed-length volume file and the storage path of the fixed-length volume file.

The name of the fixed-length volume file is used, so that when data on the server 200 is restored to the production end 100, the server 200 can search, according to the name of the fixed-length volume file, for the fixed-length volume file corresponding to the name of the fixed-length volume file, and the fixed-length volume bitmap file that is saved in association with the fixed-length volume file, and obtain, according to the storage path of the fixed-length volume file, data included in the fixed-length volume file. The fixed-length volume bitmap file is used to identify a storage address that is on the production end 100 and to which the data included in the fixed-length volume file needs to be transmitted.

Optionally, the volume mapping file further includes a name of the fixed-length volume bitmap file corresponding to the fixed-length volume file. The name of the fixed-length volume file, the storage path of the fixed-length volume file, and the name of the fixed-length volume bitmap file are in one-to-one correspondence and are saved in association. The name of the fixed-length volume file is used for searching for the fixed-length volume file corresponding to the name of the fixed-length volume file, the storage path of the fixed-length volume file is used to identify a storage location of the fixed-length volume file, and the name of the fixed-length volume bitmap file is used for searching for the fixed-length volume bitmap file corresponding to the name of the fixed-length volume bitmap file.

As shown in FIG. 17, FIG. 17 is a schematic diagram of an implementation manner of a volume mapping file that is generated by a server when the server backs up a first target volume for a second time in this application.

For example, each time the server 200 saves a fixed-length volume file in the second time of backup, the server 200 saves a file name of the fixed-length volume file and a storage path of the fixed-length volume file in association to a pre-created volume mapping file of the first target volume until names and storage paths of all fixed-length volume files are saved to the volume mapping file. The volume mapping file includes at least the name of the fixed-length volume file and the storage path of the fixed-length volume file. The name of the fixed-length volume file is used, so that when data on the server 200 is restored to the production end 100, the server 200 can search, according to the name of the fixed-length volume file, for the fixed-length volume file corresponding to the name of the fixed-length volume file, and the fixed-length volume bitmap file that is saved in association with the fixed-length volume file, and obtain, according to the storage path of the fixed-length volume file, data included in the fixed-length volume file. The fixed-length volume bitmap file is used to identify a storage address that is on the production end 100 and to which the data included in the fixed-length volume file needs to be transmitted.

A name of the first fixed-length volume file in the $N^{th}$ time of backup is saved to a location of a name of the first fixed-length volume file in the $(N-1)^{th}$ time of backup, and a name of the fourth fixed-length volume file in the $N^{th}$ time of backup is saved to a location of a name of the fourth fixed-length volume file in the $(N-1)^{th}$ time of backup.

The volume mapping file identifies that a first fixed-length volume file F_1_Snap_2 in the second time of backup is stored in a location corresponding to a storage path 1, and the first fixed-length volume file F_1_Snap_2 is corresponding to the first fixed-length data block that is stored in a storage address segment 0-3 on the production end 100; a second fixed-length volume file F_2_Snap_1 in the first time of backup is stored in a location corresponding to a storage path 2, and the second fixed-length volume file F_2_Snap_1 is corresponding to a second fixed-length data block that is stored in a storage address segment 4-7 on the production end 100; a third fixed-length volume file F_3_Snap_1 in the first time of backup is stored in a location corresponding to a storage path 3, and the third fixed-length volume file F_3_Snap_1 is corresponding to a third fixed-length data block that is stored in a storage address segment 8-11 on the production end 100; and a fourth fixed-length volume file F_4_Snap_2 in the second time of backup is stored in a location corresponding to a storage path 4, and the fourth fixed-length volume file F_4_Snap_2 is corresponding to the fourth fixed-length data block that is stored in a storage address segment 12-15 on the production end 100.

When the volume data of the first target volume 110 on the production end 100 is lost, the production end 100 may send request information to the server 200, to request the server 200 to restore the backed-up volume data of the first target volume 110 to the first target volume 110 on the production end 100. The request information includes information about a to-be-restored volume. The production end 100 may perform full restoration, or may perform incremental restoration, that is, restore only at least one fixed-length data block.

After receiving, from the production end 100, the request information used for requesting data restoration, the server 200 obtains a fixed-length volume file and a fixed-length volume bitmap file of the first target volume 110, and restores, according to the fixed-length volume file and the fixed-length volume bitmap file, data in the fixed-length volume file to a storage address that is on the production end and that is identified by the fixed-length volume bitmap file. The first target volume is the to-be-restored volume, the first target volume includes multiple fixed-length volume files, the fixed-length volume file and the fixed-length volume bitmap file are in one-to-one correspondence and are saved in association, the fixed-length volume file is used to identify valid data that needs to be stored, each fixed-length volume file is saved in association with a corresponding fixed-length volume bitmap file, the fixed-length volume bitmap file is used to identify a storage address of the valid data on the production end 100, and the production end is a to-be-backed-up virtual machine or physical server.

For example, after receiving, from the production end 100, the request information used for requesting data restoration, the server 200 reads backup information of a to-be-restored volume from the information, and obtains a specific backup time point of the to-be-restored volume from the backup information of the to-be-restored volume, to determine, according to the time point, that data in a to-be-restored volume in the $N^{th}$ ($N \geq 1$) time of backup needs to be restored to the production end. The to-be-restored volume is the first target volume 110, each time point is corresponding to one time of backup, a corresponding fixed-length volume file and a corresponding fixed-length volume bitmap file are generated during backup each time, and the fixed-length volume file and the fixed-length volume bitmap file are in one-to-one correspondence and are saved in association.

When learning that the volume data in the first target volume 110 in the first time of backup needs to be restored to the production end 100, the server 200 locally searches for all fixed-length volume files included in the first target volume 110 in the first time of backup, storage paths of the fixed-length volume files, and fixed-length volume bitmap files corresponding to the fixed-length volume files.

After obtaining names of the fixed-length volume files of the first target volume in the first time of backup and storage paths of the fixed-length volume files, the server 200 sequentially obtains, according to the names of the fixed-length volume files, the fixed-length volume bitmap files respectively corresponding to the fixed-length volume files, obtains data included in the fixed-length volume files from the storage paths of the fixed-length volumes, and transmits, according to the fixed-length volume bitmap files respectively corresponding to the fixed-length volume files, the obtained data to storage addresses on the production end 100 that are corresponding to the data and that are identified by the fixed-length volume bitmap files and saves the data. The storage addresses are storage addresses that are allocated by the production end 100 to the fixed-length volumes respectively corresponding to the fixed-length volume bitmap files.

After obtaining the name of the first fixed-length volume file of the first target volume 110 in the first time of backup and the storage path of the fixed-length volume, the server obtains, according to the name of the first fixed-length volume file, the first fixed-length volume bitmap file corresponding to the first fixed-length volume file, obtains, from the storage path of the first fixed-length volume, data included in the first fixed-length volume, and transmits, according to the first fixed-length volume bitmap file, the obtained data to the storage address corresponding to the first fixed-length volume of the first target volume 110 on the production end 100 for storage, to restore the data in the first fixed-length volume. The first fixed-length volume bitmap file identifies a storage address of each piece of data on the production end 100. For example, data sequentially obtained in descending order of addresses (the order is not limited thereto, or may be an ascending order) from the first fixed-length volume is A and B, and a bitmap of the first fixed-length volume bitmap file is "1100". The server transmits, according to the first fixed-length volume bitmap file, the first piece of data A to the first storage address in a storage address segment corresponding to the first fixed-length volume of the first target volume on the production end for storage, and transmits the second piece of data B to the second storage address in the storage address segment corresponding to the first fixed-length volume of the first target volume 110 on the production end for storage.

According to the same method, the server sequentially restores a second fixed-length volume, . . . , an $N^{th}$ fixed-length volume of the first target volume 110 to a storage address segment corresponding to the second fixed-length volume of the first target volume on the production end, . . . , a storage address segment corresponding to the $N^{th}$ fixed-length volume of the first target volume on the production end.

Optionally, the fixed-length volume file and the fixed-length volume bitmap file are obtained from the volume mapping file of the first target volume, and the volume mapping file includes at least the name of the fixed-length volume file of the fixed-length data block in the first target volume and the storage path of the fixed-length volume file.

For example, the server 200 locally obtains the volume mapping file of the first target volume 110, and obtains the name of the first fixed-length volume file and the storage path of the first fixed-length volume file of the first target volume 110 from the locally stored volume mapping file. The server 200 searches, using the name of the first fixed-length volume file and the storage path of the first fixed-length volume file, for the fixed-length volume file corresponding to the name and the first fixed-length volume bitmap file that is saved in association with the first fixed-length volume file; obtains all data in the first fixed-length volume file from the found first fixed-length volume file; sequentially transmits, according to the first fixed-length volume bitmap file corresponding to the first fixed-length volume file, the data in the first fixed-length volume file to storage areas on the production end 100 that are corresponding to storage addresses identified by the first fixed-length volume bitmap file, to restore the first fixed-length volume file.

This process is repeated until all fixed-length volume files of the first target volume 110 are restored to the production end 100.

Optionally, the volume mapping file further includes a name of the fixed-length volume bitmap file corresponding to the fixed-length volume file. The server 200 may directly obtain, from the volume mapping file, the name of the fixed-length volume file, the storage address of the fixed-length volume file, and the name of the fixed-length volume bitmap file that are associated, to restore data.

It may be understood that when all fixed-length data blocks in the first target volume in the second time of backup need to be restored to the production end, and only valid data obtained in the second time of backup is stored in the fixed-length volume file in the second time of backup, the server 200 restores the fixed-length volume file in the second time of backup to the production end 100 according to the fixed-length volume bitmap file in the second time of backup when the server 200 restores the volume data of the first target volume 110 to the production end. Then, the server 200 further compares the fixed-length volume bitmap file in the second time of backup and the fixed-length volume bitmap file in the first time of backup, to determine whether values of a same storage address in the two bitmap files are the different. When values of a same storage address in two bitmap files of any fixed-length volume are different, data corresponding to the storage address is obtained from the volume file in the first time of backup, and the data is transmitted to a storage area corresponding to the storage address on the production end 100.

When the valid data obtained in the second time of backup and the valid data obtained in the first time of backup are stored in the fixed-length volume file in the second time of backup, and when the server 200 restores all fixed-length data blocks in the first target volume 110 to the production end, the server 200 sequentially restores, according to the fixed-length volume bitmap files in the second time of backup, data in the fixed-length volume files corresponding to the fixed-length volume bitmap files to storage addresses on the production end that are identified by the fixed-length volume bitmap files, to restore the volume data of the first target volume 110 to the production end 100.

A data restoration method is the same as a method for restoring data in the first time. For a specific restoration method, refer to the foregoing related content, and details are not described herein.

It may be understood that, in this implementation manner, the storage addresses of the fixed-length volume files stored on the server 200 may be continuous, or may be discontinuous. All fixed-length volume files of the first target volume 110 that are restored from the server 200 to the production end 100 are consecutively stored according to an address sequence. In another implementation manner, when the production end 100 can identify the storage addresses of the fixed-length volume files of the first target volume 110, the storage addresses of the fixed-length volume files may be discontinuous.

In the foregoing solution, when backing up a first target volume, a server backs up only valid data in the first target volume. When a size of valid data in a fixed-length data block is less than a fixed length of the fixed-length data block, because only the valid data is backed up, an amount of data transmitted between a production end and the server can be reduced, and a backup speed can be increased. When the first target volume on the production end is a thinly configured volume, because the server does not back up storage space that has not been allocated on the production end, a backup speed can be increased, and storage space of the server is saved.

When a server restores volume data of a locally stored first target volume to a production end, because only valid data in the first target volume needs to be restored, a restoration speed can be increased. When the first target volume on the production end is a thinly configured volume, no invalid data is restored and therefore storage space does not need to be allocated to the invalid data, and storage space of the production end can be saved.

Referring to FIG. 18, FIG. 18 is a flowchart of an implementation manner of a data backup method in this application. This implementation manner is performed by a data backup apparatus, and the data backup apparatus may be a server.

When backing up volume data of a first target volume on a production end for a first time, the server needs to perform full backup on the volume data of the first target volume, and when performing backup for an $N^{th}$ (N≥2) time, the server performs incremental backup. In this implementation manner, a method for the first time of backup is the same as a method for the $N^{th}$ time of backup.

The data backup method in this implementation manner includes the following steps.

S101: A backup server obtains an original differential bitmap of a first target volume from a production end, where the production end is a to-be-backed-up virtual machine or physical server, the first target volume is a to-be-backed-up volume, and the original differential bitmap is an original differential bitmap of all fixed-length data blocks in the first target volume.

Referring to FIG. 1 and FIG. 2, FIG. 1 is a schematic diagram of an implementation manner of a storage format that is of to-be-backed-up volume data and that is based on a fixed-length volume data file, and FIG. 2 shows an original differential bitmap of a to-be-backed-up volume in FIG. 1.

Volume data shown in FIG. 1 is original volume data of a first target volume 110. A fixed length of the first target volume 110 is 16 M, and the first target volume 110 includes four 4-M (a quantity and a size are not limited thereto, and may be set to other values according to actual needs) fixed-length data blocks. A first fixed-length data block is stored at storage addresses 0 to 3, a second fixed-length data block is stored at storage addresses 4 to 7, a third fixed-length data block is stored at storage addresses 8 to 11, and a fourth fixed-length data block is stored at storage addresses 12 to 15.

In the original differential bitmap shown in FIG. 2, "1" is used to identify data in a storage area corresponding to a storage address in the first target volume 110 as valid data, and "0" is used to identify data in a storage area corresponding to a storage address in the first target volume 110 as invalid data. The valid data is defined as the storage area corresponding to the storage address stores data or data in the storage area corresponding to the storage address changes. The invalid data is defined as no data is stored in the storage area corresponding to the storage address or stored data does not change.

The server obtains the original differential bitmap of the first target volume from the production end. The production end is a to-be-backed-up virtual machine or physical server, the first target volume is a to-be-backed-up volume, and the original differential bitmap is an original differential bitmap of all fixed-length data blocks in the first target volume 110.

For example, the server interacts with a virtualization platform, and obtains an original differential bitmap of the first target volume in the first time of backup from the production end using the virtualization platform. The original differential bitmap of the first target volume is automatically generated when the production end detects that the volume data of the first target volume changes, and the original differential bitmap is the original differential bitmap of all the fixed-length data blocks in the first target volume.

S102: Obtain valid data in the fixed-length data blocks from the first target volume according to the original differential bitmap.

After obtaining the original differential bitmap of the first target volume, the server sequentially detects, in ascending order of storage addresses, values corresponding to the storage addresses, to determine whether a storage address segment corresponding to each fixed-length data block has valid data that needs to be obtained. It may be understood that, in another implementation manner, the server may sequentially detect, in descending order of storage addresses, values corresponding to the storage addresses, or may randomly detect a value corresponding to each storage address in a storage address segment corresponding to any fixed-length data block, and this is not limited herein, provided that values corresponding to all storage addresses corresponding to the volume data of the first target volume can be detected.

When detecting that a value corresponding to any storage address in the original differential bitmap is 1, the server determines that a storage area corresponding to the storage address stores valid data that needs to be obtained. The server separately obtains the valid data in the fixed-length data blocks in sequence using the fixed-length data block as a basic unit.

The server determines that valid data included in the first fixed-length data block, the second fixed-length data block, the third fixed-length data block, and the fourth fixed-length data block needs to be obtained.

The valid data obtained by the server from the first fixed-length data block is A and B, the valid data obtained from the second fixed-length data block is E and G, the valid data obtained from the third fixed-length data block is I, and the valid data obtained from the fourth fixed-length data block is P.

S103: Save a bitmap corresponding to a fixed-length data block including the valid data to a fixed-length volume bitmap file of the fixed-length data block according to the original differential bitmap, where the fixed-length volume bitmap file is used to identify a storage address of the valid data in the first target volume.

The server sequentially saves, according to the original differential bitmap in descending order of storage addresses, bitmaps corresponding to fixed-length data blocks that include the valid data to fixed-length volume bitmap files corresponding to the fixed-length data blocks in the first target volume. The fixed-length volume bitmap file is created by the server on a preset storage path, one fixed-length data block is corresponding to one fixed-length volume bitmap file, and the fixed-length volume bitmap file is used to identify the storage address of the obtained valid data in the first target volume. A storage address of valid data obtained from each fixed-length data block is in one-to-one correspondence with a storage address of an obtained bitmap corresponding to the fixed-length data block including the valid data.

For example, after obtaining the valid data included in the fixed-length data blocks, the server saves, in a form of a file according to the original differential bitmap, a bitmap corresponding to the first fixed-length data block to a first fixed-length volume bitmap file BitMap_F_1_Snap_1 created on a preset storage path.

The server 200 saves, in a form of a file, a bitmap corresponding to the second fixed-length data block to a second fixed-length volume bitmap file BitMap_F_2_Snap_1 created on a preset storage path.

The server 200 saves, in a form of a file, a bitmap corresponding to the third fixed-length data block to a third fixed-length volume bitmap file BitMap_F_3_Snap_1 created on a preset storage path.

The server 200 saves, in a form of a file, a bitmap corresponding to the fourth fixed-length data block to a fourth fixed-length volume bitmap file BitMap_F_4_Snap_1 created on a preset storage path. As shown in FIG. 12, FIG. 12 is a schematic diagram of an implementation manner of a fixed-length volume bitmap file that is generated by a server when the server backs up a first target volume for a first time in this application.

In the first time of backup, a fixed-length volume bitmap file corresponding to the first fixed-length data block is the first fixed-length volume bitmap file, and a name is BitMap_F_1_Snap_1. The first fixed-length volume bitmap file is used to identify a storage address, in the first target volume 110 on the production end 100, of the first piece of valid data in the first fixed-length data block as 0 and a storage address, in the first target volume 110 on the production end 100, of the second piece of valid data in the first fixed-length data block as 1. When the server restores data in the first time of backup to the production end, the first piece of valid data A in the first fixed-length data block needs to be saved to a storage area corresponding to the storage address 0 on the production end, and the second piece of valid data B in the first fixed-length data block needs to be saved to a storage area corresponding to the storage address 1 on the production end.

A fixed-length volume bitmap file corresponding to the second fixed-length data block is the second fixed-length volume bitmap file, and a name is BitMap_F_2_Snap_1. The second fixed-length volume bitmap file is used to identify a storage address, in the first target volume 110 on the production end 100, of the first piece of valid data in the second fixed-length data block as 4 and a storage address, in the first target volume 110 on the production end 100, of the second piece of valid data in the second fixed-length data block as 6. When the server restores the data in the first time of backup to the production end, the first piece of valid data E in the second fixed-length data block needs to be saved to a storage area corresponding to the storage address 4 on the production end, and the second piece of valid data G in the second fixed-length data block needs to be saved to a storage area corresponding to the storage address 6 on the production end.

A fixed-length volume bitmap file corresponding to the third fixed-length data block is the third fixed-length volume bitmap file, and a name is BitMap_F_3_Snap_1. The third fixed-length volume bitmap file is used to identify a storage address, in the first target volume 110 on the production end 100, of the first piece of valid data in the third fixed-length data block as 8. When the server restores the data in the first time of backup to the production end, valid data I in the third fixed-length data block needs to be saved to a storage area corresponding to the storage address 8 on the production end.

A fixed-length volume bitmap file corresponding to the fourth fixed-length data block is the fourth fixed-length volume bitmap file, and a name is BitMap_F_4_Snap_1. The fourth fixed-length volume bitmap file is used to identify a storage address, in the first target volume 110 on the production end 100, of the first piece of valid data in the fourth fixed-length data block as 15. When the server restores the data in the first time of backup to the production end, valid data P in the fourth fixed-length data block needs to be saved to a storage area corresponding to the storage address 15 on the production end.

S104: Save the valid data in the fixed-length data block to a fixed-length volume file of the fixed-length data block, where the fixed-length volume file and the fixed-length volume bitmap file are in one-to-one correspondence and are saved in association, and the fixed-length volume file is used to store the valid data in current backup.

The server sequentially saves obtained valid data in the fixed-length data blocks to pre-created fixed-length volume files respectively corresponding to the fixed-length data blocks. The fixed-length volume files are created by the server on a preset storage path, one fixed-length data block is corresponding to one fixed-length volume file, the fixed-length volume file and the fixed-length volume bitmap file are in one-to-one correspondence and are saved in association, and the fixed-length volume file is used to identify the valid data in the current backup.

As shown in FIG. 13, FIG. 13 is a schematic diagram of an implementation manner of a fixed-length volume file that is generated by a server when the server backs up a first target volume for a first time in this application.

The server sequentially saves the first piece of valid data A and the second piece of valid data B in the first fixed-length data block to a first fixed-length volume file F_1_Snap_1 created on the preset storage path.

The server sequentially saves the first piece of valid data E and the second piece of valid data G in the second fixed-length data block to a second fixed-length volume file F_2_Snap_1 created on the preset storage path.

The server saves the valid data I in the third fixed-length data block to a third fixed-length volume file F_3_Snap_1 created on the preset storage path.

The server saves the valid data P in the fourth fixed-length data block to a fourth fixed-length volume file F_4_Snap_1 created on the preset storage path.

In this implementation manner, the server sequentially obtains the valid data in the fixed-length data blocks in ascending order of the storage addresses, sequentially saves the bitmaps corresponding to the fixed-length data blocks including the valid data to the fixed-length volume bitmap files of the fixed-length data blocks, and sequentially saves the obtained valid data in the fixed-length data blocks to the fixed-length volume files corresponding to the fixed-length data blocks.

In another implementation manner, the server may sequentially obtain the valid data in the fixed-length data blocks in descending order of the storage addresses, sequentially save the bitmaps corresponding to the fixed-length data blocks including the valid data to the fixed-length volume bitmap files of the fixed-length data blocks, and sequentially save the obtained valid data in the fixed-length data blocks to the fixed-length volume files corresponding to the fixed-length data blocks. Alternatively, the server randomly obtains, using the fixed-length data block as a basic unit, valid data in the fixed-length data block and a bitmap corresponding to the fixed-length data block including the valid data, and this is not limited herein, provided that a storage address of valid data obtained from each fixed-length data block is in one-to-one correspondence with a storage address of an obtained bitmap corresponding to the fixed-length data block including the valid data.

It may be understood that storage directories of the fixed-length volume file and the fixed-length volume bitmap file that are created on the preset storage path may be the same or may be different, and this is not limited herein.

In the foregoing solution, a server obtains an original differential bitmap of a first target volume from a production end, obtains valid data in each fixed-length data block from the first target volume according to the obtained original differential bitmap, saves a bitmap corresponding to a fixed-length data block including the valid data to a fixed-length volume bitmap file of the first target volume, and saves the valid data in the fixed-length data block to a fixed-length volume file of the fixed-length data block. Because no invalid data needs to be transmitted, a data transmission amount can be reduced, a backup speed can be increased, and storage space of the server can be saved.

Figure 19:
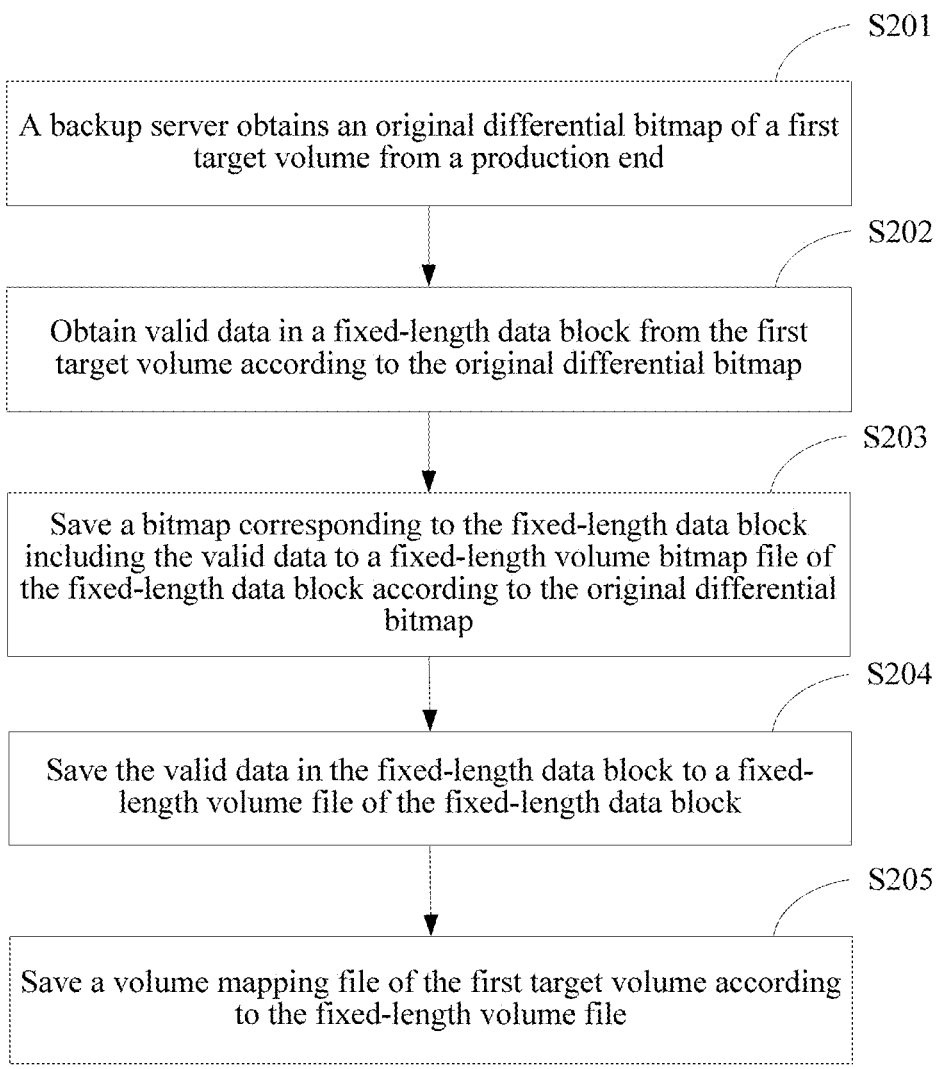
FIG. 19 is a flowchart of another implementation manner of a data backup method in this application.

Referring to FIG. 19, FIG. 19 is a flowchart of another implementation manner of a data backup method in this application. This implementation manner is performed by a data backup apparatus, and the data backup apparatus may be a server.

When backing up volume data of a first target volume on a production end for a first time, the server needs to perform full backup on the volume data of the first target volume, and when performing backup for an $N^{th}$ ($N \geq 2$) time, the server performs incremental backup. In this implementation manner, a method for the first time of backup is the same as a method for the $N^{th}$ (N≥2) time of backup, and a method for the $N^{th}$ (N≥3) time of backup is the same as a method for an $(N-1)^{th}$ time of backup.

A difference between the data backup method in this implementation manner and the data backup method in the foregoing implementation manner lies in that the data backup method in this implementation manner further includes step S205.

Steps S201 to S204 are the same as steps S101 to S104 in the foregoing implementation manner. For details, refer to steps S101 to S104 and related descriptions in the foregoing implementation manner, and the details are not described herein.

S205: Save a volume mapping file of the first target volume according to the fixed-length volume file, where the volume mapping file includes at least a name of the fixed-length volume file of the fixed-length data block in the first target volume and a storage path of the fixed-length volume file.

The server sequentially saves file names and the storage paths of the fixed-length volume files to the volume mapping file, created on the preset storage path, of the first target volume. The volume mapping file is created by the server on the preset storage path, and a corresponding volume mapping file, a corresponding fixed-length volume file, and a corresponding fixed-length volume file bitmap are generated during backup each time. The fixed-length volume file and the fixed-length volume bitmap file are in one-to-one correspondence and are saved in association. The volume mapping file includes at least names of fixed-length volume files of all the fixed-length data blocks in the first target volume and storage paths of the fixed-length volume files. The name of the fixed-length volume file and the storage path of the fixed-length volume file are in one-to-one correspondence and are saved in association.

As shown in FIG. 14, FIG. 14 is a schematic diagram of an implementation manner of a volume mapping file that is generated by a server when the server backs up a first target volume for a first time in this application.

For example, each time the server saves a fixed-length volume file in the first time of backup, the server saves a file name of the fixed-length volume file and a storage path of the fixed-length volume file in association to a pre-created volume mapping file of the first target volume until names and storage paths of all fixed-length volume files are saved to the volume mapping file. A corresponding volume mapping file, a corresponding fixed-length volume file, and a corresponding fixed-length volume bitmap file are generated during backup each time. The fixed-length volume file and the fixed-length volume bitmap file are in one-to-one correspondence and are saved in association. The volume mapping file includes at least the name of the fixed-length volume file of the fixed-length data block in the first target volume and the storage path of the fixed-length volume file. The name of the fixed-length volume file is used, so that when data on the server is restored to the production end, the server can search, according to the name of the fixed-length volume file, for the fixed-length volume file corresponding to the name of the fixed-length volume file, and the fixed-length volume bitmap file that is saved in association with the fixed-length volume file, and obtain, according to the storage path of the fixed-length volume file, data included in the fixed-length volume file. The fixed-length volume bitmap file is used to identify a storage address that is on the production end and to which the data included in the fixed-length volume file needs to be transmitted.

The volume mapping file identifies that a first fixed-length volume file F_1_Snap_1 in the first time of backup is stored in a location corresponding to a storage path 1, and the first fixed-length volume file F_1_Snap_1 is corresponding to the first fixed-length data block that is stored in a storage address segment 0-3 on the production end 100; the second fixed-length volume file F_2_Snap_1 in the first time of backup is stored in a location corresponding to a storage path 2, and the second fixed-length volume file F_2_Snap_1 is corresponding to the second fixed-length data block that is stored in a storage address segment 4-7 on the production end 100; the third fixed-length volume file F_3_Snap_1 in the first time of backup is stored in a location corresponding to a storage path 3, and the third fixed-length volume file F_3_Snap_1 is corresponding to the third fixed-length data block that is stored in a storage address segment 8-11 on the production end 100; and the fourth fixed-length volume file F_4_Snap_1 in the first time of backup is stored in a location corresponding to a storage path 4, and the fourth fixed-length volume file F_4_Snap_1 is corresponding to the fourth fixed-length data block that is stored in a storage address segment 12-15 on the production end 100.

Optionally, the volume mapping file includes a name of the fixed-length volume file and the storage path of the fixed-length volume file, and the name of the fixed-length volume bitmap file. The name of the fixed-length volume file, the storage path of the fixed-length volume file, and the name of the fixed-length volume bitmap file are in one-to-one correspondence and are saved in association. The name of the fixed-length volume file is used for searching for the fixed-length volume file corresponding to the name of the fixed-length volume file, the storage path of the fixed-length volume file is used to identify a storage location of the fixed-length volume file, and the name of the fixed-length volume bitmap file is used for searching for the fixed-length volume bitmap file corresponding to the name of the fixed-length volume bitmap file.

In this implementation manner, the server sequentially obtains the valid data in the fixed-length data blocks in ascending order of the storage addresses, sequentially saves the bitmaps corresponding to the fixed-length data blocks including the valid data to the fixed-length volume bitmap files of the fixed-length data blocks, and sequentially saves the obtained valid data in the fixed-length data blocks to the fixed-length volume files corresponding to the fixed-length data blocks.

In another implementation manner, the server may sequentially obtain the valid data in the fixed-length data blocks in descending order of the storage addresses, sequentially save the bitmaps corresponding to the fixed-length data blocks including the valid data to the fixed-length volume bitmap files of the fixed-length data blocks, and sequentially save the obtained valid data in the fixed-length data blocks to the fixed-length volume files corresponding to the fixed-length data blocks. Alternatively, the server randomly obtains, using the fixed-length data block as a basic unit, valid data in the fixed-length data block and a bitmap corresponding to the fixed-length data block including the valid data, and this is not limited herein, provided that a storage address of valid data obtained from each fixed-length data block is in one-to-one correspondence with a storage address of an obtained bitmap corresponding to the fixed-length data block including the valid data.

The storage path of the fixed-length volume file and the storage path of the fixed-length volume bitmap file are next-level directories of a storage path of the fixed-length volume mapping file.

It may be understood that storage directories of the fixed-length volume file and the fixed-length volume bitmap file that are created on the preset storage path may be the same or may be different, and this is not limited herein.

In the foregoing solution, a server obtains an original differential bitmap of a first target volume from a production end, obtains valid data in each fixed-length data block from the first target volume according to the obtained original differential bitmap, saves a bitmap corresponding to a fixed-length data block including the valid data to a fixed-length volume bitmap file of the first target volume, and saves the valid data in the fixed-length data block to a fixed-length volume file of the fixed-length data block. Because no invalid data needs to be transmitted, a data transmission amount can be reduced, a backup speed can be increased, and storage space of the server can be saved.

Figure 20:
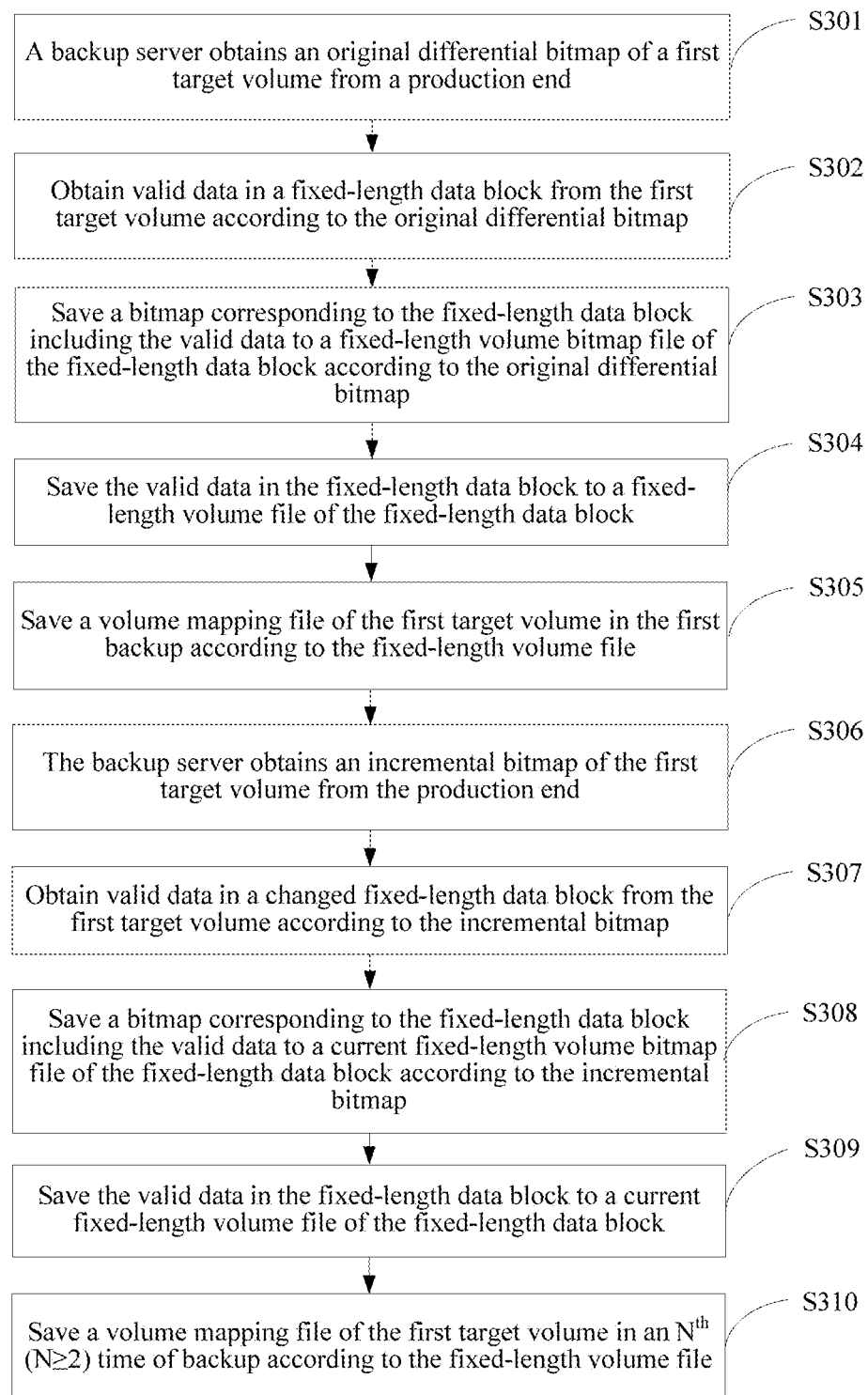
FIG. 20 is a flowchart of still another implementation manner of a data backup method in this application.

Referring to FIG. 20, FIG. 20 is a flowchart of still another implementation manner of a data backup method in this application. This implementation manner is performed by a data backup apparatus, and the data backup apparatus may be a server.

When backing up volume data of a first target volume on a production end for a first time, the server needs to perform full backup on the volume data of the first target volume, and when performing backup for an $N^{th}$ ($N \geq 2$) time, the server performs incremental backup. In this implementation manner, a method for the first time of backup is different from a method for the $N^{th}$ time of ($N \geq 2$) backup, that is, a backup method in full backup is different from a backup method in incremental backup, and a method for a second time of backup is the same as a method for the $N^{th}$ time of ($N \geq 3$) backup.

In this implementation manner, in steps S301 to S305, full backup is performed on the volume data of the first target volume on the production end, and in steps S306 to S310, incremental backup is performed on the volume data of the first target volume on the production end.

Steps S301 to S305 are the same as steps S201 to S205 in the foregoing implementation manner. For details, refer to steps S201 to S205 and related descriptions in the foregoing implementation manner, and details are not described herein.

S301: A backup server obtains an original differential bitmap of a first target volume from a production end. Step S301 is the same as step S101 in the foregoing implementation manner. For details, refer to related descriptions of step S101 in the foregoing implementation manner, and the details are not described herein.

S302: Obtain valid data in a fixed-length data block from the first target volume according to the original differential bitmap. Step S302 is the same as step S102 in the foregoing implementation manner. For details, refer to related descriptions of step S102 in the foregoing implementation manner, and the details are not described herein.

S303: Save a bitmap corresponding to the fixed-length data block including the valid data to a fixed-length volume bitmap file of the fixed-length data block according to the original differential bitmap. Step S303 is the same as step S103 in the foregoing implementation manner. For details, refer to related descriptions of step S103 in the foregoing implementation manner, and the details are not described herein.

S304: Save the valid data in the fixed-length data block to a fixed-length volume file of the fixed-length data block. Step S304 is the same as step S104 in the foregoing implementation manner. For details, refer to related descriptions of step S104 in the foregoing implementation manner, and the details are not described herein.

S305: Save a volume mapping file of the first target volume in a first time of backup according to the fixed-length volume file. Step S305 is the same as step S205 in the foregoing implementation manner. For details, refer to related descriptions of step S205 in the foregoing implementation manner, and the details are not described herein.

S306: The backup server obtains an incremental bitmap of the first target volume from the production end, where the incremental bitmap is a differential bitmap of a changed fixed-length data block in the first target volume.

The backup server obtains the incremental bitmap of the first target volume from the production end, where the incremental bitmap is the differential bitmap of the changed fixed-length data block in the first target volume. The following is described using a second time of backup as an example.

Referring to FIG. 6 and FIG. 7, FIG. 6 is a schematic diagram of another implementation manner of a storage format that is of to-be-backed-up volume data and that is based on a fixed-length volume data file, and FIG. 7 shows an original differential bitmap of the to-be-backed-up volume data in FIG. 6 relative to that in FIG. 1. Volume data shown in shadow regions in FIG. 6 is changed volume data in a first target volume 110, and data stored in storage areas corresponding to storage addresses 0, 3, 13, and 15 changes. The original differential bitmap shown in FIG. 7 is an original differential bitmap of the volume data in FIG. 6 relative to volume data in the first time of backup in FIG. 1, that is, an incremental bitmap of the to-be-backed-up volume data. "1" is used to identify that data in a storage area corresponding to a storage address changes, and the changed data is valid data.

For example, when receiving a backup instruction for an $N^{th}$ ($N \geq 2$, and in this case, $N=2$) time of backup, the backup server creates, on preset storage paths, a volume mapping file, fixed-length volume files, and fixed-length volume bitmap files of a to-be-backed-up volume in the second time of backup.

A name of the created volume mapping file in the second time of backup is D_2 volume mapping file. The fixed-length volume files created in a directory of the D_2 volume mapping file include a first fixed-length volume F_1_Snap_2, F_2_Snap_2, F_3_Snap_2, and F_4_Snap_2, and the created fixed-length volume bitmap files include BitMap_F_1_Snap_2, BitMap_F_2_Snap_2, BitMap_F_3_Snap_2, and BitMap_F_4_Snap_2. The volume mapping file includes at least names of fixed-length volume files of all fixed-length data blocks in the first target volume and storage paths of the fixed-length volume files. The fixed-length volume file and the fixed-length volume bitmap file are in one-to-one correspondence and are saved in association.

The backup server interacts with a virtualization platform, and obtains an incremental bitmap of the first target volume 110 in the second time of backup from the production end 100 using the virtualization platform. The incremental bitmap of the first target volume 110 is automatically generated when the production end 100 detects that volume data of the first target volume 110 changes, and the incremental bitmap includes a differential bitmap of all changed fixed-length data blocks in the first target volume 110.

The incremental bitmap, obtained by the backup server, of the first target volume in the second time of backup includes an incremental bitmap BitMap_F_1 of a first fixed-length data block and an incremental bitmap BitMap_F_4 of a fourth fixed-length data block. BitMap_F_1 is used to identify that on the production end, the first piece of valid data A' in the first fixed-length data block is stored in a storage area corresponding to a storage address 0, and the second piece of valid data C in the first fixed-length data block is stored in a storage area corresponding to a storage address 2.

BitMap_F_4 is used to identify that on the production end, the first piece of valid data N in the fourth fixed-length data block is stored in a storage area corresponding to a storage address 13, and the second piece of valid data P' in the fourth fixed-length data block is stored in a storage area corresponding to a storage address 15.

S307: Obtain valid data in the changed fixed-length data block from the first target volume according to the incremental bitmap.

For example, after obtaining the incremental bitmap of the first target volume, the backup server sequentially detects, in ascending order of storage addresses, values corresponding to the storage addresses, to determine whether a storage address segment corresponding to each fixed-length data block has valid data that needs to be obtained. It may be understood that, in another implementation manner, the server may sequentially detect, in descending order of storage addresses, values corresponding to the storage addresses, or may randomly detect a value corresponding to each storage address in a storage address segment corresponding to any fixed-length data block, and this is not limited herein, provided that values corresponding to all storage addresses corresponding to the volume data of the first target volume can be detected. When detecting that a value corresponding to any storage address in the incremental bitmap is 1, the server determines that a storage area corresponding to the storage address stores valid data that needs to be obtained. The server separately obtains valid data in changed fixed-length data blocks in sequence using the fixed-length data block as a basic unit.

The server determines that data in the first fixed-length data block and data in the fourth fixed-length data block change, and need to obtain valid data in the first fixed-length data block and valid data in the fourth fixed-length data block. The valid data obtained by the server from the changed first fixed-length data block is A' and C, and the valid data obtained from the fourth fixed-length data block is N and P'.

S308: Save a bitmap corresponding to the fixed-length data block including the valid data to a current fixed-length volume bitmap file of the fixed-length data block according to the incremental bitmap.

For example, the backup server obtains, from locally stored fixed-length volume bitmap files in the first time of backup according to the incremental bitmap, a fixed-length volume bitmap file that is in an $(N-1)^{th}$ time of backup and corresponding to the fixed-length data block including the valid data, combines an incremental bitmap, corresponding to each fixed-length data block including the valid data, in the $N^{th}$ time of backup and a fixed-length volume bitmap file, corresponding to the fixed-length data block including the valid data, in the $(N-1)^{th}$ time of backup, and saves a bitmap obtained after combination to a current fixed-length volume bitmap file of the fixed-length data block, to obtain a fixed-length volume bitmap file in the $N^{th}$ time of backup.

As shown in FIG. 15, FIG. 15 is a schematic diagram of a fixed-length volume bitmap file that is generated by a backup server in a second time of backup in this application.

The backup server obtains, from the locally stored fixed-length volume bitmap files in the first time of backup according to the incremental bitmap BitMap_F_1 of the first fixed-length data block including the valid data, a fixed-length volume bitmap file BitMap_F_1_Snap_1 corresponding to the first fixed-length data block, performs "OR" on and combines the incremental bitmap BitMap_F_1 corresponding to the first fixed-length data block in the second time of backup and the fixed-length volume bitmap file BitMap_F_1_Snap_1 in the first time of backup, and saves a bitmap obtained after combination to a current fixed-length volume bitmap file of the fixed-length data block, to obtain a fixed-length volume bitmap file BitMap_F_1_Snap_2 corresponding to the first fixed-length data block in the second time of backup.

The backup server obtains, from the locally stored fixed-length volume bitmap files in the first time of backup according to the incremental bitmap BitMap_F_4 of the first fixed-length data block including the valid data, a fixed-length volume bitmap file BitMap_F_4_Snap_1 corresponding to the fourth fixed-length data block, performs "OR" on and combines the incremental bitmap BitMap_F_4 corresponding to the fourth fixed-length data block in the second time of backup and the fixed-length volume bitmap file BitMap_F_4_Snap_1 in the first time of backup, and saves a bitmap obtained after combination to a current fixed-length volume bitmap file of the fixed-length data block, to obtain a fixed-length volume bitmap file BitMap_F_4_Snap_2 corresponding to the fourth fixed-length data block in the second time of backup.

S309: Save the valid data in the fixed-length data block to a current fixed-length volume file of the fixed-length data block.

For example, after obtaining the fixed-length volume bitmap file, in the $N^{th}$ ($N \geq 2$, and in this case, N=2) time of backup, of the fixed-length data block including the valid data, the backup server compares an incremental bitmap of the fixed-length data block in the $N^{th}$ time of backup and the fixed-length volume bitmap file of the fixed-length data block in the $N^{th}$ time of backup, to determine whether the incremental bitmap in the $N^{th}$ time of backup is the same as the fixed-length volume bitmap file in the $N^{th}$ time of backup. A determining method is determining whether same storage addresses are corresponding to a same value.

When determining that the incremental bitmap of the fixed-length data block in the current backup is the same as the fixed-length volume bitmap file of the fixed-length data block, the backup server saves the obtained valid data in the changed fixed-length data block to the current fixed-length volume file of the fixed-length data block, to obtain the fixed-length volume file corresponding to the fixed-length data block in the $N^{th}$ time of backup.

When determining that the incremental bitmap of the fixed-length data block in the current backup is different from the fixed-length volume bitmap file of the fixed-length data block, the backup server obtains, from a locally stored fixed-length volume file in the $(N-1)^{th}$ time of backup, valid data corresponding to storage addresses with different values.

Then, the obtained valid data in the changed fixed-length data block and the valid data that is obtained from the fixed-length volume file in the $(N-1)^{th}$ time of backup are sequentially saved to a current fixed-length volume file of the fixed-length data block according to a sequence of storage addresses, to obtain a fixed-length volume file corresponding to the fixed-length data block in the $N^{th}$ time of backup.

As shown in FIG. 16, FIG. 16 is a schematic diagram of an implementation manner of fixed-length volume file that is saved by a server when the server backs up a first target volume for a second time in this application.

Valid data stored in the current fixed-length volume file of the first fixed-length data block is A', B, and C, and A' and C are valid data obtained in the $N^{th}$ time of backup from the changed fixed-length data block, and B is valid data obtained from the fixed-length volume file that is saved in the $(N-1)^{th}$ time of backup.

Valid data stored in the current fixed-length volume file of the fourth fixed-length data block is N and P', and N and P' are valid data obtained in the $N^{th}$ time of backup from the changed fixed-length data block.

It may be understood that the valid data is data stored in the changed fixed-length data block in the current backup, and includes changed data in the current backup and valid data in previous backup. In this implementation manner, an incremental bitmap of the first fixed-length data block in the current backup is different from the fixed-length volume bitmap file of the first fixed-length data block, and an incremental bitmap of the fourth fixed-length data block in the current backup is the same as the fixed-length volume bitmap file of the fourth fixed-length data block.

In this implementation manner, when determining that an incremental bitmap of a fixed-length data block in the current backup is different from a fixed-length volume bitmap file of the fixed-length data block, the backup server obtains valid data corresponding to storage addresses with different values from the locally stored fixed-length volume file in the $(N-1)^{th}$ time of backup. In another implementation manner, the backup server may directly obtain the valid data corresponding to the storage addresses with different values from the first target volume on the production end. In this case, a transmission channel between the production end and the server may be occupied and a transmission rate is relatively low.

S310: Save a volume mapping file of the first target volume in an $N^{th}$ (N≥2) time of backup according to the fixed-length volume file.

After obtaining a fixed-length volume file saved in the second time of backup, the backup server saves a file name of the fixed-length volume file and a storage path of the fixed-length volume file in association to a pre-created volume mapping file of the first target volume until names and storage paths of all fixed-length volume files are saved to the volume mapping file. The volume mapping file includes at least the name of the fixed-length volume file and the storage path of the fixed-length volume file.

The name of the fixed-length volume file is used, so that when data on the server is restored to the production end, the server can search, according to the name of the fixed-length volume file, for the fixed-length volume file corresponding to the name of the fixed-length volume file, and the fixed-length volume bitmap file that is saved in association with the fixed-length volume file, and obtain, according to the storage path of the fixed-length volume file, data included in the fixed-length volume file. The fixed-length volume bitmap file is used to identify a storage address that is on the production end and to which the data included in the fixed-length volume file needs to be transmitted.

Optionally, the volume mapping file further includes a name of the fixed-length volume bitmap file corresponding to the fixed-length volume file. The name of the fixed-length volume file, the storage path of the fixed-length volume file, and the name of the fixed-length volume bitmap file are in one-to-one correspondence and are saved in association. The name of the fixed-length volume file is used for searching for the fixed-length volume file corresponding to the name of the fixed-length volume file, the storage path of the fixed-length volume file is used to identify a storage location of the fixed-length volume file, and the name of the fixed-length volume bitmap file is used for searching for the fixed-length volume bitmap file corresponding to the name of the fixed-length volume bitmap file.

As shown in FIG. 17, FIG. 17 is a schematic diagram of an implementation manner of a volume mapping file that is generated by a server when the server backs up a first target volume for a second time in this application.

For example, each time the backup server saves a fixed-length volume file in the second time of backup, the backup server saves a file name of the fixed-length volume file and a storage path of the fixed-length volume file in association to a pre-created volume mapping file of the first target volume until names and storage paths of all fixed-length volume files are saved to the volume mapping file. The volume mapping file includes at least the name of the fixed-length volume file and the storage path of the fixed-length volume file. The name of the fixed-length volume file is used, so that when data on the server is restored to the production end, the server can search, according to the name of the fixed-length volume file, for the fixed-length volume file corresponding to the name of the fixed-length volume file, and the fixed-length volume bitmap file that is saved in association with the fixed-length volume file, and obtain, according to the storage path of the fixed-length volume file, data included in the fixed-length volume file. The fixed-length volume bitmap file is used to identify a storage address that is on the production end and to which the data included in the fixed-length volume file needs to be transmitted.

A name of the first fixed-length volume file in the $N^{th}$ time of backup is saved to a location of a name of the first fixed-length volume file in the $(N-1)^{th}$ time of backup, and a name of the fourth fixed-length volume file in the $N^{th}$ time of backup is saved to a location of a name of the fourth fixed-length volume file in the $(N-1)^{th}$ time of backup.

The volume mapping file identifies that a first fixed-length volume file F_1_Snap_2 in the second time of backup is stored in a location corresponding to a storage path 1, and the first fixed-length volume file F_1_Snap_2 is corresponding to the first fixed-length data block that is stored in a storage address segment 0-3 on the production end; a second fixed-length volume file F_2_Snap_1 in the first time of backup is stored in a location corresponding to a storage path 2, and the second fixed-length volume file F_2_Snap_1 is corresponding to a second fixed-length data block that is stored in a storage address segment 4-7 on the production end; a third fixed-length volume file F_3_Snap_1 in the first time of backup is stored in a location corresponding to a storage path 3, and the third fixed-length volume file F_3_Snap_1 is corresponding to a third fixed-length data block that is stored in a storage address segment 8-11 on the production end; and a fourth fixed-length volume file F_4_Snap_2 in the second time of backup is stored in a location corresponding to a storage path 4, and the fourth fixed-length volume file F_4_Snap_2 is corresponding to the fourth fixed-length data block that is stored in a storage address segment 12-15 on the production end.

In this implementation manner, the server sequentially obtains valid data in the fixed-length data blocks in ascending order of the storage addresses, sequentially saves bitmaps corresponding to the fixed-length data blocks including the valid data to the fixed-length volume bitmap files of the fixed-length data blocks, and sequentially saves the obtained valid data in the fixed-length data blocks to the fixed-length volume files corresponding to the fixed-length data blocks.

In another implementation manner, the server may sequentially obtain the valid data in the fixed-length data blocks in descending order of the storage addresses, sequentially save the bitmaps corresponding to the fixed-length data blocks including the valid data to the fixed-length volume bitmap files of the fixed-length data blocks, and sequentially save the obtained valid data in the fixed-length data blocks to the fixed-length volume files corresponding to the fixed-length data blocks. Alternatively, the server randomly obtains, using the fixed-length data block as a basic unit, valid data in the fixed-length data block and a bitmap corresponding to the fixed-length data block including the valid data, and this is not limited herein, provided that a storage address of valid data obtained from each fixed-length data block is in one-to-one correspondence with a storage address of an obtained bitmap corresponding to the fixed-length data block including the valid data.

The storage path of the fixed-length volume file and the storage path of the fixed-length volume bitmap file are next-level directories of a storage path of the fixed-length volume mapping file.

It may be understood that storage directories of the fixed-length volume file and the fixed-length volume bitmap file that are created on the preset storage path may be the same or may be different, and this is not limited herein.

In the foregoing manner, a server obtains a bitmap of a first target volume from a production end, obtains valid data in each fixed-length data block from the first target volume according to the obtained bitmap, saves a bitmap corresponding to the fixed-length data block including the valid data to a fixed-length volume bitmap file of the first target volume, and saves the valid data in the fixed-length data block to a fixed-length volume file of the first target volume. When backing up the first target volume, the server backs up only valid data in the first target volume. Therefore, when a size of the valid data in the fixed-length data block is less than a fixed length of the fixed-length data block, because only the valid data is backed up, an amount of data transmitted between the production end and the server can be reduced, and a backup speed can be increased. When the first target volume on the production end is a thinly configured volume, because the server does not back up storage space that has not been allocated on the production end, a backup speed can be increased, and storage space of the server is saved.

When determining that an incremental bitmap of a fixed-length data block in current backup is different from a fixed-length volume bitmap file of the fixed-length data block, a backup server obtains, from a locally stored fixed-length volume file in an $(N-1)^{th}$ time of backup, valid data corresponding to storage addresses with different values, and saves the valid data to a current fixed-length volume file of the fixed-length data block, to prevent loss or deletion of the fixed-length volume file that is saved in the $(N-1)^{th}$ time of backup, and loss of data corresponding to the storage addresses with different values.

Figure 21:
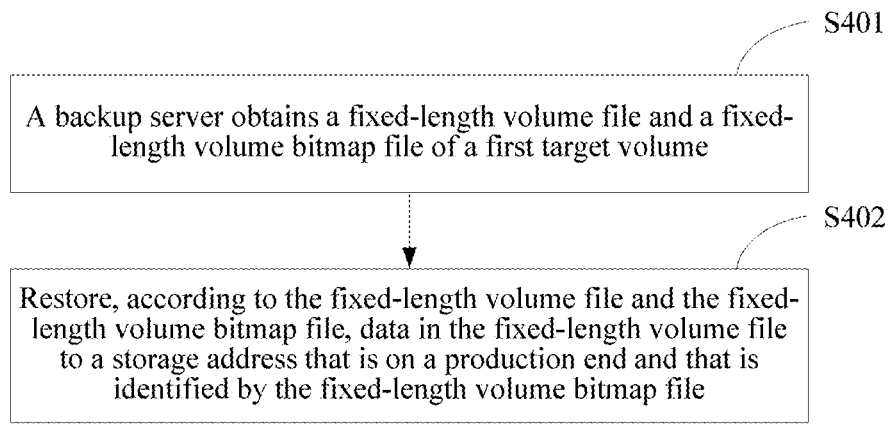
FIG. 21 is a flowchart of an implementation manner of a data restoration method in this application.

Referring to FIG. 21, FIG. 21 is a flowchart of an implementation manner of a data restoration method in this application. This implementation manner is performed by a data restoration apparatus, and the data restoration apparatus may be a server. A data backup apparatus may be integrated with the data restoration apparatus, or may exist independently. The restoration method in this implementation manner includes the following steps.

S401: A backup server obtains a fixed-length volume file and a fixed-length volume bitmap file of a first target volume, where the first target volume is a to-be-restored volume, the first target volume includes multiple fixed-length volume files, the fixed-length volume file and the fixed-length volume bitmap file are in one-to-one correspondence and are saved in association, the fixed-length volume file is used to identify valid data that needs to be stored, and the fixed-length volume bitmap file is used to identify a storage address of the valid data on a production end.

After receiving, from the production end, request information used for requesting data restoration, the backup server obtains the fixed-length volume file and the fixed-length volume bitmap file of the first target volume. The request information is used to identify backup data that is requested to be restored, the request information includes backup information of the first target volume, and the backup information of the first target volume includes at least a backup time point. The first target volume is a to-be-restored volume, the first target volume includes multiple fixed-length volume files, and the fixed-length volume file is used to identify the valid data that needs to be stored. The fixed-length volume bitmap file is used to identify the storage address of the valid data, and the production end is a to-be-backed-up virtual machine or physical server.

For example, after receiving, from the production end, the request information used for requesting data restoration, the backup server reads backup information of the to-be-restored volume from the information, and obtains a specific backup time point of a to-be-restored volume from the backup information of the to-be-restored volume, to determine, according to the time point, that data in a to-be-restored volume in the $N^{th}$ ($N \geq 1$) time of backup needs to be restored to the production end. The to-be-restored volume is the first target volume, each time point is corresponding to one time of backup, a corresponding fixed-length volume file and a corresponding fixed-length volume bitmap file are generated during backup each time, and the fixed-length volume file and the fixed-length volume bitmap file are in one-to-one correspondence and are saved in association.

For example, when learning that the volume data in the first target volume in the first time of backup needs to be restored to the production end, the backup server locally searches for all fixed-length volume files included in the first target volume in the first time of backup, storage paths of the fixed-length volume files, and fixed-length volume bitmap files corresponding to the fixed-length volume files. The backup data is valid data.

Optionally, the fixed-length volume file and the fixed-length volume bitmap file are obtained from a volume mapping file of the first target volume, and the volume mapping file includes at least a name of a fixed-length volume file of a fixed-length data block in the first target volume and a storage path of the fixed-length volume file.

For example, the backup server locally obtains the volume mapping file of the first target volume, obtains the name of the fixed-length volume file of the fixed-length data block in the first target volume and the storage path of the fixed-length volume file from the volume mapping file, and searches, according to a name of each fixed-length volume file and a storage path of the fixed-length volume file, for the fixed-length volume file corresponding to the name and a fixed-length volume bitmap file that is saved in association with the fixed-length volume file.

The backup server learns, from the volume mapping file, that a name of a first fixed-length volume file of a first fixed-length data block in the first time of backup is F_1_Snap_1, and a storage path is 1, searches for the first fixed-length volume file according to the name of the first fixed-length volume file, and obtains a first fixed-length volume bitmap file BitMap_F_1_Snap_1 that is saved in association with the first fixed-length volume file.

The backup server learns that a name of a second fixed-length volume file of a second fixed-length data block in the first time of backup is F_2_Snap_1, searches for the second fixed-length volume file according to the name of the second fixed-length volume file and a storage path 2, and obtains a second fixed-length volume bitmap file BitMap_F_2_Snap_1 that is saved in association with the second fixed-length volume file.

The backup server learns that a name of a third fixed-length volume file of a third fixed-length data block in the first time of backup is F_3_Snap_1 and a storage path is 3, searches for the third fixed-length volume file according to the name of the third fixed-length volume file, and obtains a third fixed-length volume bitmap file BitMap_F_3_Snap_1 that is saved in association with the third fixed-length volume file.

The backup server learns that a name of a fourth fixed-length volume file of a fourth fixed-length data block in the first time of backup is F_4_Snap_1 and a storage path is 4, searches for the fourth fixed-length volume file according to the name of the fourth fixed-length volume file, and obtains a fourth fixed-length volume bitmap file BitMap_F_4_Snap_1 that is saved in association with the fourth fixed-length volume file.

Optionally, the volume mapping file further includes a name of the fixed-length volume bitmap file corresponding to the fixed-length volume file. The backup server may directly obtain, from the volume mapping file, the name of the fixed-length volume file, a storage address of the fixed-length volume file, and the name of the fixed-length volume bitmap file that are saved in association, to obtain each fixed-length volume file and a fixed-length volume bitmap file corresponding to the fixed-length volume.

S402: Restore, according to the fixed-length volume file and the fixed-length volume bitmap file, data in the fixed-length volume file to the storage address that is on the production end and that is identified by the fixed-length volume bitmap file.

After locally obtaining each fixed-length volume file of the first target volume, a storage path of the fixed-length volume file, and a fixed-length volume bitmap file corresponding to the fixed-length volume file, the backup server obtains data included in the fixed-length volume file from the storage path corresponding to the fixed-length volume file, and transmits, according to the fixed-length volume bitmap file corresponding to the fixed-length volume file, the data in the fixed-length volume file to a storage area corresponding to a storage address that is on the production end and that is identified by the fixed-length volume bitmap file.

For example, after the server obtains names of the fixed-length volume files of the first target volume in the first time of backup and storage paths of the fixed-length volume files, the server sequentially obtains, according to the names of the fixed-length volume files, the fixed-length volume bitmap files respectively corresponding to the fixed-length volume files, separately obtains data included in the fixed-length volume files from the storage paths of the fixed-length volumes, and transmits, according to the fixed-length volume bitmap files respectively corresponding to the fixed-length volume files, the obtained data to storage addresses on the production end that are corresponding to the data and that are identified by the fixed-length volume bitmap files for storage. The storage addresses are storage addresses that are allocated by the production end to the fixed-length volumes corresponding to the fixed-length volume bitmap files.

After obtaining the name of the first fixed-length volume file of the first target volume in the first time of backup and the storage path of the fixed-length volume, the server obtains, according to the name of the first fixed-length volume file, the first fixed-length volume bitmap file corresponding to the first fixed-length volume file, obtains, from the storage path of the first fixed-length volume, data included in the first fixed-length volume, and transmits, according to the first fixed-length volume bitmap file, the obtained data to the storage address corresponding to the first fixed-length volume of the first target volume on the production end for storage, to restore the data in the first fixed-length volume. The first fixed-length volume bitmap file identifies a storage address of each piece of data on the production end.

It is assumed that data obtained sequentially in descending order of addresses (the order is not limited thereto, or may be an ascending order) from the first fixed-length volume is A and B, and a bitmap of the first fixed-length volume bitmap file is "1100". The server transmits, according to the first fixed-length volume bitmap file, the first piece of data A to the first storage address in a storage address segment corresponding to the first fixed-length volume of the first target volume on the production end for storage, and transmits the second piece of data B to the second storage address in the storage address segment corresponding to the first fixed-length volume of the first target volume on the production end for storage.

According to the same method, the server sequentially restores a second fixed-length volume, . . . , an $N^{th}$ fixed-length volume of the first target volume to a storage address segment corresponding to the second fixed-length volume of the first target volume on the production end, . . . , a storage address segment corresponding to the $N^{th}$ fixed-length volume of the first target volume on the production end.

Optionally, when the fixed-length volume file and the fixed-length volume bitmap file are obtained from the volume mapping file of the first target volume, all data in fixed-length volume files is sequentially obtained from storage paths respectively corresponding to the fixed-length volume files in the first target volume, and according to fixed-length volume bitmap files respectively corresponding to the fixed-length volume files, the data in the fixed-length volume files is sequentially transmitted to storage areas corresponding to storage addresses on the production end that are identified by the fixed-length volume bitmap files, to restore the first target volume.

It may be understood that, in this implementation manner, the storage addresses of the fixed-length volume files stored on the server may be continuous, or may be discontinuous. All fixed-length volume files of the first target volume that are restored from the server to the production end are consecutively stored according to an address sequence. In another implementation manner, when the production end can identify the storage addresses of the fixed-length volume files of the first target volume, the storage addresses of the fixed-length volume files may be discontinuous.

It may be understood that the server may perform full restoration or incremental restoration on the first target volume on the production end. The incremental restoration is only at least one fixed-length data block is restored.

When performing full restoration on the first target volume on the production end, the server obtains fixed-length volume files corresponding to all fixed-length data blocks in the first target volume, storage paths of the fixed-length volume files, and fixed-length volume bitmap files corresponding to the fixed-length volume files, and sequentially transmits, according to the fixed-length volume bitmap files respectively corresponding to the fixed-length volume files, data included in the fixed-length volume files and obtained from the storage paths of the fixed-length volume files to storage addresses on the production end that are corresponding to the data and that are identified by the fixed-length volume bitmap files for storage.

When the server performs incremental restoration on the first target volume on the production end, the server obtains a fixed-length volume file corresponding to a fixed-length data block that needs to be restored in the first target volume, a storage path of the fixed-length volume file that needs to be restored, and a fixed-length volume bitmap file corresponding to the fixed-length volume file that needs to be restored, and transmits, according to fixed-length volume bitmap file corresponding to fixed-length volume file that needs to be restored, data that is included in the fixed-length volume file and that is obtained from storage paths of the fixed-length volume file to a storage address that is on the production end and corresponding to the data and that is identified by the fixed-length volume bitmap file.

In the foregoing solution, when a server restores volume data of a locally stored first target volume to a production end, because only valid data in the first target volume needs to be restored, a restoration speed can be increased. When the first target volume on the production end is a thinly configured volume, no invalid data is restored and therefore storage space does not need to be allocated to the invalid data, and storage space of the production end can be saved.

Figure 22:
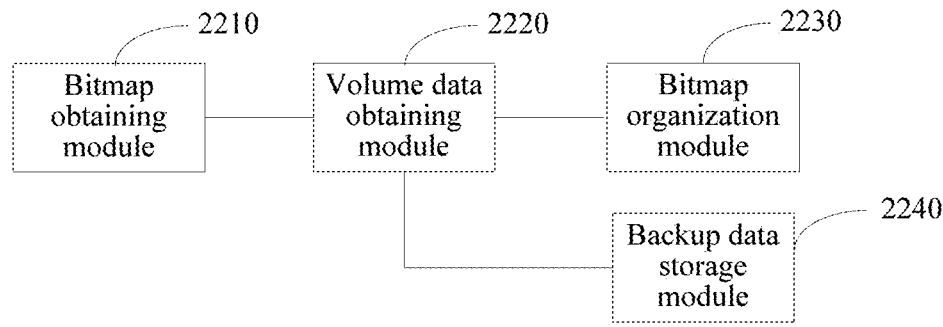
FIG. 22 is a schematic structural diagram of an implementation manner of a data backup apparatus in this application.

Referring to FIG. 22, FIG. 22 is a schematic structural diagram of an implementation manner of a data backup apparatus in this application. The data backup apparatus in this application may be a server, and modules in the data backup apparatus in this implementation manner are configured to perform corresponding steps in the data backup method shown in FIG. 18. For details, refer to related descriptions of the method implementation manner corresponding to FIG. 18, and the details are not described herein. The data backup apparatus in this implementation manner includes a bitmap obtaining module 2210, a volume data obtaining module 2220, a bitmap organization module 2230, and a backup data storage module 2240.

The bitmap obtaining module 2210 is configured to obtain an original differential bitmap of a first target volume from a production end. The first target volume is a to-be-backed-up volume, and the original differential bitmap is an original differential bitmap of all fixed-length data blocks in the first target volume. For example, the bitmap obtaining module 2210 obtains the original differential bitmap of the first target volume from the production end. The production end is a to-be-backed-up virtual machine or physical server, the first target volume is the to-be-backed-up volume, and the original differential bitmap is the original differential bitmap of all the fixed-length data blocks in the first target volume. The bitmap obtaining module 2210 sends the obtained original differential bitmap of the first target volume to the volume data obtaining module 2220.

The volume data obtaining module 2220 is configured to obtain valid data in the fixed-length data blocks from the first target volume according to the original differential bitmap obtained by the bitmap obtaining module 2210. For example, the volume data obtaining module 2220 obtains the original differential bitmap sent by the bitmap obtaining module 2210, and obtains valid data in each fixed-length data block from the first target volume according to the original differential bitmap. The volume data obtaining module 2220 sends the original differential bitmap to the bitmap organization module 2230, and sends the valid data in each fixed-length data block to the backup data storage module 2240.

The bitmap organization module 2230 is configured to save a bitmap corresponding to a fixed-length data block including the valid data to a fixed-length volume bitmap file of the fixed-length data block according to the original differential bitmap, and the fixed-length volume bitmap file is used to identify a storage address of the valid data in the first target volume.

For example, the bitmap organization module 2230 receives the original differential bitmap sent by the volume data obtaining module 2220, obtains, according to the original differential bitmap, the bitmap corresponding to the fixed-length data block including the valid data, and saves the bitmap corresponding to the fixed-length data block including the valid data to the fixed-length volume bitmap file of the fixed-length data block. The fixed-length volume bitmap file is created on a preset storage path, one fixed-length data block is corresponding to one fixed-length volume bitmap file, and the fixed-length volume bitmap file is used to identify the storage address of the obtained valid data in the first target volume on the production end.

The backup data storage module 2240 is configured to save the valid data, obtained by the volume data obtaining module 2220, in the fixed-length data block to a fixed-length volume file of the fixed-length data block, and the fixed-length volume file and the fixed-length volume bitmap file are in one-to-one correspondence and are saved in association, and the fixed-length volume file is used to store the valid data in current backup.

For example, the backup data storage module 2240 receives the valid data, sent by the volume data obtaining module 2220, in each fixed-length data block in the first target volume, and saves the valid data in the fixed-length data block to the fixed-length volume file corresponding to the fixed-length data block. The fixed-length volume file is pre-created on a preset storage path, one fixed-length data block is corresponding to one fixed-length volume file, one fixed-length volume file is corresponding to one fixed-length volume bitmap file, each fixed-length volume file is saved in association with a corresponding fixed-length volume bitmap file, and the fixed-length volume file is used to identify the valid data in the current backup.

In this implementation manner, the server sequentially obtains the valid data in the fixed-length data blocks in ascending order of storage addresses, sequentially saves bitmaps corresponding to the fixed-length data blocks including the valid data to fixed-length volume bitmap files of the fixed-length data blocks, and sequentially saves the obtained valid data in the fixed-length data blocks to fixed-length volume files corresponding to the fixed-length data blocks.

In another implementation manner, the server may sequentially obtain the valid data in the fixed-length data blocks in descending order of storage addresses, sequentially save bitmaps corresponding to the fixed-length data blocks including the valid data to fixed-length volume bitmap files of the fixed-length data blocks, and sequentially save the obtained valid data in the fixed-length data blocks to fixed-length volume files corresponding to the fixed-length data blocks. Alternatively, the server randomly obtains, using the fixed-length data block as a basic unit, valid data in the fixed-length data block and a bitmap corresponding to the fixed-length data block including the valid data, and this is not limited herein, provided that a storage address of valid data obtained from each fixed-length data block is in one-to-one correspondence with a storage address of an obtained bitmap corresponding to the fixed-length data block including the valid data.

It may be understood that storage directories of the fixed-length volume file and the fixed-length volume bitmap file that are created on the preset storage path may be the same or may be different, and this is not limited herein.

Figure 23:
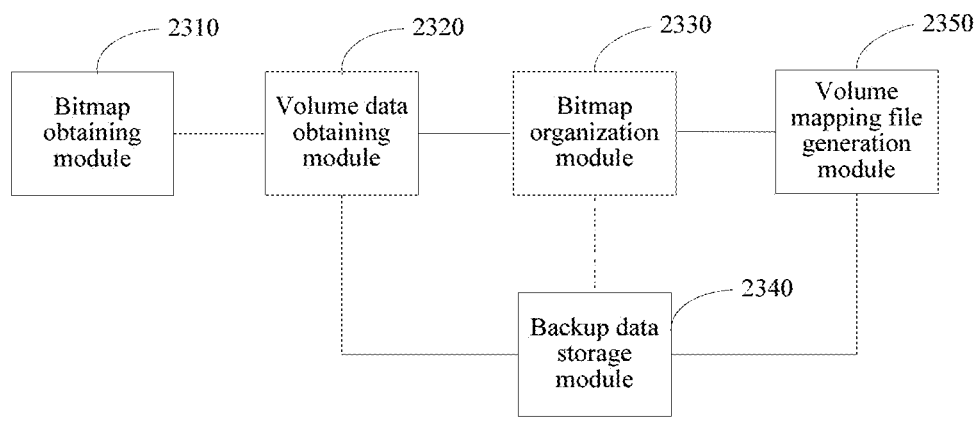
FIG. 23 is a schematic structural diagram of another implementation manner of a data backup apparatus in this application.

Referring to FIG. 23, FIG. 23 is a schematic structural diagram of another implementation manner of a data backup apparatus in this application. The data backup apparatus in this application may be a server, and modules in the data backup apparatus in this implementation manner are configured to perform corresponding steps in the data backup method shown in FIG. 19. For details, refer to related descriptions of the method implementation corresponding to FIG. 19, and the details are not described herein. A difference between this implementation manner and the foregoing implementation manner lies in that the data backup apparatus in this implementation manner further includes a volume mapping file generation module 2350.

The volume mapping file generation module 2350 is configured to save a volume mapping file of the first target volume according to the fixed-length volume file. The volume mapping file includes at least a name of the fixed-length volume file and a storage path of the fixed-length volume file, and the volume mapping file is used to identify a storage location of each fixed-length volume file.

For example, the volume mapping file generation module 2350 receives the name, sent by the backup data storage module 2340, of the fixed-length volume file, and saves the name of the fixed-length volume file and the storage path of the fixed-length volume file in association to the volume mapping file, pre-created on a preset storage path, of the first target volume. During backup each time, the first target volume is corresponding to a different volume mapping file, the volume mapping file is pre-created on the preset storage path, the volume mapping file includes at least the name of the fixed-length volume file and the storage path of the fixed-length volume file, and the volume mapping file is used to identify the storage location of the fixed-length volume file.

Optionally, the volume mapping file further includes a name of the fixed-length volume bitmap file corresponding to the fixed-length volume file. The name of the fixed-length volume file, the storage path of the fixed-length volume file, and the name of the fixed-length volume bitmap file are in one-to-one correspondence and are saved in association. The name of the fixed-length volume file is used for searching for the fixed-length volume file corresponding to the name of the fixed-length volume file, the storage path of the fixed-length volume file is used to identify the storage location of the fixed-length volume file, and the name of the fixed-length volume bitmap file is used for searching for the fixed-length volume bitmap file corresponding to the name of the fixed-length volume bitmap file.

For example, the volume mapping file generation module 2350 further receives the name, sent by the bitmap organization module 2330, of the fixed-length volume bitmap file, and saves the name of the fixed-length volume file, the storage path of the fixed-length volume file, and the fixed-length volume bitmap file in association to the volume mapping file, pre-created on the preset storage path, of the first target volume.

In the foregoing solution, a server obtains an original differential bitmap of a first target volume from a production end, obtains valid data in each fixed-length data block from the first target volume according to the obtained original differential bitmap, saves a bitmap corresponding to a fixed-length data block including the valid data to a fixed-length volume bitmap file of the first target volume, and saves the valid data in the fixed-length data block to a fixed-length volume file of the first target volume. Because no invalid data needs to be transmitted, an amount of data transmitted between the production end and the server can be reduced, a backup speed can be increased, and storage space of the server can be saved.

In addition, a volume mapping file identifies a storage address of each fixed-length volume file, so that when restoring volume data of the first target volume to the production end, the server can rapidly obtain a fixed-length volume file of the first target volume, a storage address of the fixed-length volume file, and a fixed-length volume bitmap file corresponding to the fixed-length volume file, and can obtain data in the fixed-length volume file according to the storage address of the fixed-length volume file.

Referring to FIG. 23, in another implementation manner, modules in the data backup apparatus in this implementation manner are configured to perform corresponding steps in the data backup method shown in FIG. 20. For details, refer to related descriptions in the method implementation corresponding manner to FIG. 20, and the details are not described herein.

The data backup apparatus in this implementation manner includes a bitmap obtaining module 2310, a volume data obtaining module 2320, a bitmap organization module 2330, a backup data storage module 2340, and a volume mapping file generation module 2350.

The bitmap obtaining module 2310 is configured to, when a backup server performs a first time of backup on a production end, obtain an original differential bitmap of a first target volume from the production end. The first target volume is a to-be-backed-up volume, and the original differential bitmap is an original differential bitmap of all fixed-length data blocks in the first target volume. For example, the bitmap obtaining module 2310 obtains the original differential bitmap of the first target volume from the production end. The production end is a to-be-backed-up virtual machine or physical server, the first target volume is the to-be-backed-up volume, and the original differential bitmap is the original differential bitmap of all the fixed-length data blocks in the first target volume.

The bitmap obtaining module 2310 is further configured to, when the backup server performs an $N^{th}$ ($N \geq 2$) time of backup on the production end, obtain an incremental bitmap of the first target volume from the production end. The incremental bitmap is a differential bitmap of a changed fixed-length data block in the first target volume.

The bitmap obtaining module 2310 sends the original differential bitmap that is obtained in the first time of backup and that is of the first target volume and the incremental bitmap that is obtained in the $N^{th}$ ($N \geq 2$) time of backup and that is of the first target volume to the volume data obtaining module 2320.

The volume data obtaining module 2320 is configured to, in the first time of backup, obtain valid data in the fixed-length data blocks from the first target volume according to the original differential bitmap obtained by the bitmap obtaining module 2310. For example, in the first time of backup, the volume data obtaining module 2320 receives the original differential bitmap that is of the first target volume and that is sent by the bitmap obtaining module 2310, and obtains valid data in each fixed-length data block from the first target volume according to the original differential bitmap.

The volume data obtaining module 2320 is further configured to, in the $N^{th}$ (N≥2) time of backup, obtain valid data in the changed fixed-length data block from the first target volume according to the incremental bitmap obtained by the bitmap obtaining module 2310. For example, in the $N^{th}$ (N≥2) time of backup, the volume data obtaining module 2320 receives the incremental bitmap that is of the first target volume and that is sent by the bitmap obtaining module 2310, and obtains the valid data in the changed fixed-length data block from the first target volume according to the incremental bitmap.

In the first time of backup, the volume data obtaining module 2320 sends the original differential bitmap to the bitmap organization module 2330, and sends the valid data in each fixed-length data block to the backup data storage module 2340. In the $N^{th}$ (N≥2) time of backup, the volume data obtaining module 2320 further sends the incremental bitmap to the bitmap organization module 2330, and sends the valid data in the changed fixed-length data block to the backup data storage module 2340.

The bitmap organization module 2330 is configured to, in the first time of backup, save a bitmap corresponding to a fixed-length data block including the valid data to a fixed-length volume bitmap file of the fixed-length data block according to the original differential bitmap. The fixed-length volume bitmap file is used to identify a storage address of the valid data in the first target volume.

For example, in the first time of backup, the bitmap organization module 2330 receives the original differential bitmap sent by the volume data obtaining module 2320, obtains, according to the original differential bitmap, the bitmap corresponding to the fixed-length data block including the valid data, and saves the bitmap corresponding to the fixed-length data block including the valid data to the fixed-length volume bitmap file of the fixed-length data block. The fixed-length volume bitmap file is created on a preset storage path, one fixed-length data block is corresponding to one fixed-length volume bitmap file, and the fixed-length volume bitmap file is used to identify the storage address of the obtained valid data in the first target volume on the production end.

The bitmap organization module 2330 is further configured to, in the $N^{th}$ (N≥2) time of backup, save a bitmap corresponding to the fixed-length data block including the valid data to a current fixed-length volume bitmap file of the fixed-length data block according to the incremental bitmap. For example, in the $N^{th}$ (N≥2) time of backup, the bitmap organization module 2330 receives the incremental bitmap sent by the volume data obtaining module 2320, and saves the bitmap corresponding to the fixed-length data block including the valid data to the current fixed-length volume bitmap file of the fixed-length data block according to the incremental bitmap.

In the first time of backup, the bitmap organization module 2330 sends the name of the fixed-length volume bitmap file to the volume mapping file generation module 2350. In the $N^{th}$ (N≥2) time of backup, the bitmap organization module 2330 sends the bitmap corresponding to the fixed-length data block including the valid data to the backup data storage module 2340, and sends a name of the current fixed-length volume bitmap file to the volume mapping file generation module 2350.

The backup data storage module 2340 is configured to, in the first time of backup, save the valid data obtained by the volume data obtaining module 2320 from the fixed-length data block to a fixed-length volume file of the first target volume. The fixed-length volume file and the fixed-length volume bitmap file are in one-to-one correspondence and are saved in association, and the fixed-length volume file is used to identify the valid data in the current backup.

For example, the backup data storage module 2340 receives the valid data, sent by the volume data obtaining module 2320, in each fixed-length data block in the first target volume, and saves the valid data in the fixed-length data block to the fixed-length volume file corresponding to the fixed-length data block. The fixed-length volume file is pre-created on a preset storage path, one fixed-length data block is corresponding to one fixed-length volume file, one fixed-length volume file is corresponding to one fixed-length volume bitmap file, each fixed-length volume file is saved in association with a corresponding fixed-length volume bitmap file, and the fixed-length volume file is used to identify the valid data in the current backup.

The backup data storage module 2340 is further configured to save the valid data in the fixed-length data block to a current fixed-length volume file of the fixed-length data block. For example, the backup data storage module 2340 is further configured to, in the $N^{th}$ (N≥2) time of backup, receive the bitmap that is sent by the bitmap organization module 2330 and that is corresponding to the fixed-length data block including the valid data, and save the valid data in the fixed-length data block to the current fixed-length volume file of the fixed-length data block according to the bitmap corresponding to the fixed-length data block including the valid data.

The backup data storage module 2340 sends the name of the fixed-length volume file in the first time of backup and the name of the current fixed-length volume file in the $N^{th}$ (N≥2) time of backup to the volume mapping file generation module 2350.

The volume mapping file generation module 2350 is configured to, in the first time of backup, save a volume mapping file of the first target volume according to the fixed-length volume file. The volume mapping file includes at least a name of the fixed-length volume file and a storage path of the fixed-length volume file, and the volume mapping file is used to identify a storage location of each fixed-length volume file.

For example, in the first time of backup, the volume mapping file generation module 2350 receives the name, sent by the backup data storage module 2340, of the fixed-length volume file, and saves the name of the fixed-length volume file and the storage path of the fixed-length volume file in association to the volume mapping file, pre-created on the preset storage path, of the first target volume. During backup each time, the first target volume is corresponding to a different volume mapping file, the volume mapping file is pre-created on the preset storage path, the volume mapping file includes at least the name of the fixed-length volume file and the storage path of the fixed-length volume file, and the volume mapping file is used to identify the storage location of the fixed-length volume file.

The volume mapping file generation module 2350 is further configured to, in the $N^{th}$ (N≥2) time of backup, generate a volume mapping file of the first target volume according to the current fixed-length volume file. For example, in the $N^{th}$ (N≥2) time of backup, the volume mapping file generation module 2350 receives the name, sent by the backup data storage module 2340, of the current fixed-length volume file, and saves the name of the fixed-length volume file and the storage path of the fixed-length volume file in association to the volume mapping file, pre-created on the preset storage path, of the first target volume.

Optionally, the volume mapping file further includes a name of the fixed-length volume bitmap file corresponding to the fixed-length volume file. The name of the fixed-length volume file, the storage path of the fixed-length volume file, and the name of the fixed-length volume bitmap file are in one-to-one correspondence and are saved in association. The name of the fixed-length volume file is used for searching for the fixed-length volume file corresponding to the name of the fixed-length volume file, the storage path of the fixed-length volume file is used to identify a storage location of the fixed-length volume file, and the name of the fixed-length volume bitmap file is used for searching for the fixed-length volume bitmap file corresponding to the name of the fixed-length volume bitmap file.

For example, the volume mapping file generation module 2350 further receives the fixed-length volume bitmap file sent by the bitmap organization module 2330, and saves the name of the fixed-length volume file, the storage path of the fixed-length volume file, and the fixed-length volume bitmap file in association to the volume mapping file, pre-created on the preset storage path, of the first target volume.

In this implementation manner, the server sequentially obtains the valid data in the fixed-length data blocks in ascending order of storage addresses, sequentially saves bitmaps corresponding to the fixed-length data blocks including the valid data to fixed-length volume bitmap files of the fixed-length data blocks, and sequentially saves the obtained valid data in the fixed-length data blocks to fixed-length volume files corresponding to the fixed-length data blocks.

In another implementation manner, the server may sequentially obtain the valid data in the fixed-length data blocks in descending order of storage addresses, sequentially save bitmaps corresponding to the fixed-length data blocks including the valid data to fixed-length volume bitmap files of the fixed-length data blocks, and sequentially save the obtained valid data in the fixed-length data blocks to fixed-length volume files corresponding to the fixed-length data blocks. Alternatively, the server randomly obtains, using the fixed-length data block as a basic unit, valid data in the fixed-length data block and a bitmap corresponding to the fixed-length data block including the valid data, and this is not limited herein, provided that a storage address of valid data obtained from each fixed-length data block is in one-to-one correspondence with a storage address of an obtained bitmap corresponding to the fixed-length data block including the valid data.

It may be understood that storage directories of the fixed-length volume file and the fixed-length volume bitmap file that are created on the preset storage path may be the same or may be different, and this is not limited herein.

In the foregoing solution, when backing up a first target volume, a server backs up only valid data in the first target volume. When a size of valid data in a fixed-length data block is less than a fixed length of the fixed-length data block, because only the valid data is backed up, an amount of data transmitted between a production end and the server can be reduced, and a backup speed can be increased. When the first target volume on the production end is a thinly configured volume, because the server does not back up storage space that has not been allocated on the production end, a backup speed can be increased, and storage space of the server is saved.

In addition, a volume mapping file identifies a storage address of each fixed-length volume file, so that when restoring data in the first target volume to the production end, the server can rapidly obtain a fixed-length volume file of the first target volume, a storage address of the fixed-length volume file, and a fixed-length volume bitmap file corresponding to the fixed-length volume file, and can obtain data in the fixed-length volume file according to the storage address of the fixed-length volume file.

Figure 24:
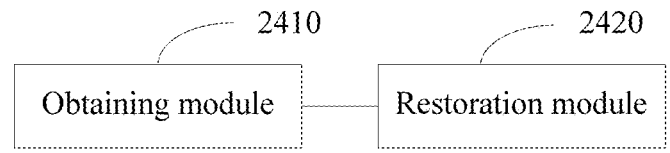
FIG. 24 is a schematic structural diagram of an implementation manner of a data restoration apparatus in this application.

Referring to FIG. 24, FIG. 24 is a schematic structural diagram of an implementation manner of a data restoration apparatus in this application. The data restoration apparatus may be a server. The data restoration apparatus in this implementation manner may be integrated with the data backup apparatus in the foregoing implementation manner, or may exist independently. Modules in the data restoration apparatus in this implementation manner are configured to separately perform corresponding steps in the restoration method in FIG. 21. The data restoration apparatus in this implementation manner includes an obtaining module 2410 and a restoration module 2420.

The obtaining module 2410 is configured to obtain a fixed-length volume file and a fixed-length volume bitmap file of a first target volume. The first target volume is a to-be-restored volume, the first target volume includes multiple fixed-length volume files, the fixed-length volume file is used to identify valid data that needs to be stored, one fixed-length volume file is corresponding to one fixed-length volume bitmap file, and the fixed-length volume bitmap file is used to identify a storage address of the valid data on a production end.

For example, the obtaining module 2410 locally obtains the fixed-length volume file and the fixed-length volume bitmap file of the first target volume. The first target volume is the to-be-restored volume, the first target volume includes multiple fixed-length volume files, the fixed-length volume file and the fixed-length volume bitmap file are in one-to-one correspondence and are saved in association, the fixed-length volume file is used to identify valid data that needs to be stored, and the fixed-length volume bitmap file is used to identify the storage address of the valid data on the production end. The obtaining module 2410 sends the obtained fixed-length volume file and fixed-length volume bitmap file of the first target volume to the restoration module 2420.

The restoration module 2420 is configured to restore, according to the fixed-length volume file and the fixed-length volume bitmap file, data in the fixed-length volume file to the storage address that is on the production end and that is identified by the fixed-length volume bitmap file. The production end is a to-be-backed-up virtual machine or physical server.

For example, the restoration module 2420 receives the fixed-length volume file and the fixed-length volume bitmap file of the first target volume, and restore, according to each fixed-length volume bitmap file, data in a fixed-length volume file corresponding to the fixed-length volume bitmap file to a storage address that is on the production end and that is identified by the fixed-length volume bitmap file. The production end is a to-be-backed-up virtual machine or physical server. The storage address is a storage address that is allocated by the production end to the fixed-length volume corresponding to the fixed-length volume bitmap file.

In another implementation manner, the obtaining module 2410 is configured to obtain the fixed-length volume file and the fixed-length volume bitmap file from a volume mapping file of the first target volume. The volume mapping file includes at least a name of the fixed-length volume file of fixed-length data block in the first target volume and a storage path of the fixed-length volume file, and each fixed-length volume file is saved in association with a corresponding fixed-length volume bitmap file. The volume mapping file is used to direct the obtaining module 2410 to search for a fixed-length volume file corresponding to each fixed-length data blocks, and a fixed-length volume bitmap file corresponding to the fixed-length volume file corresponding to the fixed-length data block.

For example, the obtaining module 2410 locally obtains the volume mapping file of the first target volume, and separately obtains the name of the fixed-length volume file of the first target volume and the storage address of the fixed-length volume file from the volume mapping file. The obtaining module 2410 searches, according to the name of the fixed-length volume file and the storage path of the fixed-length volume file, for the fixed-length volume file corresponding to the name and a fixed-length volume bitmap file that is saved in association with the fixed-length volume file. The obtaining module 2410 sends the obtained fixed-length volume file and fixed-length volume bitmap file of the first target volume to the restoration module 2420, so that the restoration module 2420 restores volume data of the first target volume to the production end according to the fixed-length volume file and the fixed-length volume bitmap file of the first target volume.

Optionally, the volume mapping file further includes a name of the fixed-length volume bitmap file corresponding to the fixed-length volume file. For example, the obtaining module 2410 may directly obtain, from the volume mapping file, the name of the fixed-length volume file, the storage address of the fixed-length volume file, and the name of the fixed-length volume bitmap file that are associated.

For example, the obtaining module 2410 locally obtains the volume mapping file of the first target volume, the obtaining module 2410 may directly obtain, from the volume mapping file, the name of the fixed-length volume file, the storage path of the fixed-length volume file, and the name of the fixed-length volume bitmap file that are saved in association, search, according to the name of the fixed-length volume file and the storage path of the fixed-length volume file, for the fixed-length volume file corresponding to the name, and searches, according to the name of the fixed-length volume bitmap file, for the fixed-length volume bitmap file corresponding to the name.

The obtaining module 2410 sends the obtained fixed-length volume file and fixed-length volume bitmap file of the first target volume to the restoration module 2420, so that the restoration module 2420 restores volume data of the first target volume to the production end according to the fixed-length volume file and the fixed-length volume bitmap file of the first target volume.

In the foregoing solution, when a server restores volume data of a locally stored first target volume to a production end, because only valid data in the first target volume needs to be restored, a restoration speed can be increased. When the first target volume on the production end is a thinly configured volume, no invalid data is restored and therefore storage space does not need to be allocated to the invalid data, and storage space of the production end can be saved.

Figure 25:
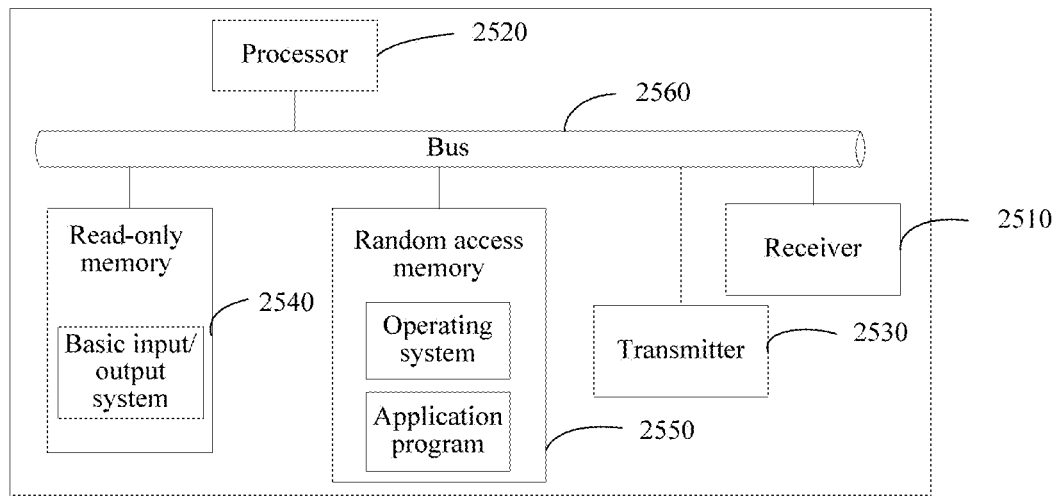
FIG. 25 is a schematic structural diagram of still another implementation manner of a data backup apparatus in this application.

Referring to FIG. 25, FIG. 25 is a schematic structural diagram of still another implementation manner of a data backup apparatus in this application. The data backup apparatus may be a server. The data backup apparatus in this implementation manner includes a receiver 2510, a processor 2520, a transmitter 2530, a read-only memory 2540, a random access memory 2550, and a bus 2560.

The receiver 2510 is configured to receive data.

The processor 2520 controls an operation of the data backup apparatus, and the processor 2520 may also be referred to as a central processing unit (CPU). The processor 2520 may be an integrated circuit chip and has a signal processing capability, or the processor 2520 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor or the like.

The transmitter 2530 is configured to send data.

The memory may include the read-only memory 2540 and the random access memory 2550, and provides an instruction and data to the processor 2520. A part of the memory may further include a non-volatile random access memory (NVRAM).

Components of the data backup apparatus are coupled using the bus 2560, and in addition to a data bus, the bus 2560 may further include a power bus, a control bus, a status signal bus, and the like. However, for clear description, various buses are marked as the bus 2560 in the figure.

The memory stores the following elements, executable modules or data structures, or a subset thereof, or an extension set thereof: operation instructions including various operation instructions, used to implement various operations; and an operating system including various system programs, used to implement various fundamental services and process hardware-based tasks.

In this embodiment of the present disclosure, the processor 2520 performs the following operations by invoking the operation instructions (the operation instructions may be stored in the operating system) stored in the memory.

The processor 2520 is configured to obtain an original differential bitmap of a first target volume from a production end. The first target volume is a to-be-backed-up volume, and the original differential bitmap is an original differential bitmap of all fixed-length data blocks in the first target volume.

The processor 2520 saves a bitmap corresponding to a fixed-length data block including valid data to a fixed-length volume bitmap file of the first target volume according to the obtained original differential bitmap. The fixed-length volume bitmap file is used to identify a storage address of the valid data in the first target volume.

The processor 2520 is configured to save the valid data in the fixed-length data block to a fixed-length volume file of the fixed-length data block. The fixed-length volume file and the fixed-length volume bitmap file are in one-to-one correspondence and are saved in association, and the fixed-length volume file is used to store the valid data in current backup.

Optionally, the processor 2520 is further configured to save a volume mapping file of the first target volume according to the fixed-length volume file. The volume mapping file includes at least a name of the fixed-length volume file of the fixed-length data block in the first target volume and a storage path of the fixed-length volume file.

Optionally, the processor 2520 is further configured to obtain an incremental bitmap of the first target volume from the production end. The incremental bitmap is a differential bitmap of a changed fixed-length data block in the first target volume.

The processor 2520 is further configured to obtain valid data in the changed fixed-length data block from the first target volume according to the incremental bitmap.

The processor 2520 is further configured to save a bitmap corresponding to the fixed-length data block including the valid data to a current fixed-length volume bitmap file of the fixed-length data block according to the incremental bitmap.

The processor 2520 is further configured to save the valid data in the fixed-length data block to a current fixed-length volume file of the fixed-length data block.

Optionally, the volume mapping file further includes a name of the fixed-length volume bitmap file corresponding to the fixed-length volume file.

In the foregoing solution, when backing up a first target volume, a server backs up only valid data in the first target volume. When a size of valid data in a fixed-length data block is less than a fixed length of the fixed-length data block, because only the valid data is backed up, an amount of data transmitted between a production end and the server can be reduced, and a backup speed can be increased. When the first target volume on the production end is a thinly configured volume, because the server does not back up storage space that has not been allocated on the production end, a backup speed can be increased, and storage space of the server is saved.

In addition, a volume mapping file identifies a storage address of each fixed-length volume file, so that when restoring data in the first target volume to the production end, the server can rapidly obtain a fixed-length volume file of the first target volume, a storage address of the fixed-length volume file, and a fixed-length volume bitmap file corresponding to the fixed-length volume file, and can obtain data in the fixed-length volume file according to the storage address of the fixed-length volume file.

Figure 26:
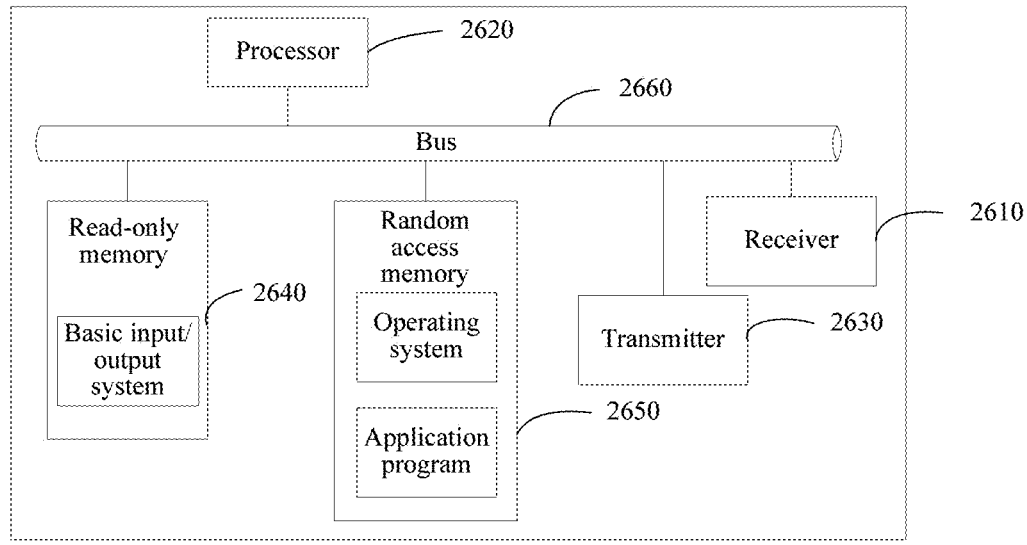
FIG. 26 is a schematic structural diagram of another implementation manner of a data restoration apparatus in this application.

Referring to FIG. 26, FIG. 26 is a schematic structural diagram of another implementation manner of a data restoration apparatus in this application. The data restoration apparatus may be a server. The data restoration apparatus in this implementation manner may be integrated with the data backup apparatus shown in FIG. 25, or may exist independently. The data restoration apparatus in this implementation manner includes a receiver 2610, a processor 2620, a transmitter 2630, a read-only memory 2640, a random access memory 2650, and a bus 2660.

The receiver 2610 is configured to receive data.

The processor 2620 controls an operation of the data restoration apparatus, and the processor 2620 may also be referred to as a CPU. The processor 2620 may be an integrated circuit chip and has a signal processing capability, or the processor 2620 may be a general purpose processor, a DSP, an ASIC, a FPGA, or another programmable logical device, discrete gate or transistor logical device, or discrete hardware component. The general purpose processor may be a microprocessor or the processor may be any conventional processor or the like.

The transmitter 2630 is configured to send data.

The memory may include the read-only memory 2640 and the random access memory 2650, and provides an instruction and data to the processor 2620. A part of the memory may further include a NVRAM.

Components of the data restoration apparatus are coupled using the bus 2660, and in addition to a data bus, the bus 2660 may further include a power bus, a control bus, a status signal bus, and the like. However, for clear description, various buses are marked as the bus 2660 in the figure.

The memory stores the following elements, executable modules or data structures, or a subset thereof, or an extension set thereof: operation instructions including various operation instructions, used to implement various operations; and an operating system including various system programs, used to implement various fundamental services and process hardware-based tasks.

In this embodiment of the present disclosure, the processor 2620 performs the following operations by invoking the operation instructions (the operation instructions may be stored in the operating system) stored in the memory.

The processor 2620 is configured to obtain a fixed-length volume file and a fixed-length volume bitmap file of a first target volume. The first target volume is a to-be-restored volume, the first target volume includes multiple fixed-length volume files, the fixed-length volume file and the fixed-length volume bitmap file are in one-to-one correspondence and are saved in association, the fixed-length volume file is used to identify valid data that needs to be stored, and the fixed-length volume bitmap file is used to identify a storage address of the valid data on a production end.

The processor 2620 is configured to restore, according to the fixed-length volume file and the fixed-length volume bitmap file, data in the fixed-length volume file to the storage address that is on the production end and that is identified by the fixed-length volume bitmap file.

Optionally, the processor 2620 obtains the fixed-length volume file and the fixed-length volume bitmap file from a volume mapping file of the first target volume. The volume mapping file includes at least a name of the fixed-length volume file of fixed-length data block in the first target volume and a storage path of the fixed-length volume file, and each fixed-length volume file is saved in association with a corresponding fixed-length volume bitmap file.

Optionally, the volume mapping file further includes a name of the fixed-length volume bitmap file corresponding to the fixed-length volume file.

In the foregoing solution, when a server restores volume data of a locally stored first target volume to a production end, because only valid data in the first target volume needs to be restored, a restoration speed can be increased. When the first target volume on the production end is a thinly configured volume, no invalid data is restored and therefore storage space does not need to be allocated to the invalid data, and storage space of the production end can be saved.

In the foregoing description, to illustrate rather than limit, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

What is claimed is:

1. A data backup method, comprising:
    obtaining, by a backup server, an original differential bitmap of a first target volume from a production end, wherein the first target volume is a to-be-backed-up volume, and wherein the original differential bitmap is an original differential bitmap of all fixed-length data blocks in the first target volume;

obtaining valid data in the fixed-length data blocks from the first target volume according to the original differential bitmap;
saving a bitmap corresponding to a fixed-length data block comprising the valid data to a fixed-length volume bitmap file of the fixed-length data block according to the original differential bitmap, wherein the fixed-length volume bitmap file is used to identify a storage address of the valid data in the first target volume; and
saving the valid data in the fixed-length data block to a fixed-length volume file of the fixed-length data block, wherein the fixed-length volume file and the fixed-length volume bitmap file are in one-to-one correspondence and are saved in association, and wherein the fixed-length volume file is used to store the valid data in current backup.

2. The method according to claim 1, further comprising saving a volume mapping file of the first target volume according to the fixed-length volume file, wherein the volume mapping file comprises at least a name of the fixed-length volume file of the fixed-length data block in the first target volume and a storage path of the fixed-length volume file.

3. The method according to claim 2, further comprising:
obtaining, by the backup server, an incremental bitmap of the first target volume from the production end, wherein the incremental bitmap is a differential bitmap of a changed fixed-length data block in the first target volume;
obtaining valid data in the changed fixed-length data block from the first target volume according to the incremental bitmap;
saving a bitmap corresponding to a fixed-length data block comprising the valid data to a fixed-length volume bitmap file of the fixed-length data block according to the incremental bitmap; and
saving the valid data in the fixed-length data block to a current fixed-length volume file of the fixed-length data block.

4. The method according to claim 2, wherein the volume mapping file further comprises a name of the fixed-length volume bitmap file corresponding to the fixed-length volume file.

5. A data restoration method, comprising:
obtaining, by a backup server, a fixed-length volume file and a fixed-length volume bitmap file of a first target volume, wherein the first target volume is a to-be-restored volume, wherein the first target volume comprises multiple fixed-length volume files, wherein the fixed-length volume file and the fixed-length volume bitmap file are in one-to-one correspondence and are saved in association, wherein the fixed-length volume file is used to identify valid data that needs to be stored, and wherein the fixed-length volume bitmap file is used to identify a storage address of the valid data on a production end; and
restoring, according to the fixed-length volume file and the fixed-length volume bitmap file, data in the fixed-length volume file to the storage address that is on the production end and that is identified by the fixed-length volume bitmap file.

6. The method according to claim 5, wherein the fixed-length volume file and the fixed-length volume bitmap file are obtained according to a volume mapping file of the first target volume, and wherein the volume mapping file comprises at least a name of a fixed-length volume file of a fixed-length data block in the first target volume and a storage path of the fixed-length volume file.

7. The method according to claim 6, wherein the volume mapping file further comprises a name of the fixed-length volume bitmap file corresponding to the fixed-length volume file.

8. A data backup apparatus, comprising:
a memory storing executable instructions; and
a processor coupled to the memory and configured to:
obtain an original differential bitmap of a first target volume from a production end, wherein the first target volume is a to-be-backed-up volume, and wherein the original differential bitmap is an original differential bitmap of all fixed-length data blocks in the first target volume;
obtain valid data in the fixed-length data blocks from the first target volume according to the original differential bitmap;
save a bitmap corresponding to a fixed-length data block comprising the valid data to a fixed-length volume bitmap file of the fixed-length data block according to the original differential bitmap, wherein the fixed-length volume bitmap file is used to identify a storage address of the valid data in the first target volume; and
save the valid data, obtained by the processor, in the fixed-length data block to a fixed-length volume file of the fixed-length data block, wherein the fixed-length volume file and the fixed-length volume bitmap file are in one-to-one correspondence and are saved in association, and wherein the fixed-length volume file is used to store the valid data in current backup.

9. The data backup apparatus according to claim 8, wherein the processor is further configured to save a volume mapping file of the first target volume according to the fixed-length volume file, wherein the volume mapping file comprises at least a name of the fixed-length volume file of the fixed-length data block in the first target volume and a storage path of the fixed-length volume file.

10. The data backup apparatus according to claim 9, wherein the processor is further configured to:
obtain an incremental bitmap of the first target volume from the production end, wherein the incremental bitmap is a differential bitmap of a changed fixed-length data block in the first target volume;
obtain valid data in the changed fixed-length data block from the first target volume according to the incremental bitmap;
save a bitmap corresponding to a fixed-length data block comprising the valid data to a current fixed-length volume bitmap file of the fixed-length data block according to the incremental bitmap; and
save the valid data in the fixed-length data block to a current fixed-length volume file of the fixed-length data block.

11. The data backup apparatus according to claim 9, wherein the volume mapping file further comprises a name of the fixed-length volume bitmap file corresponding to the fixed-length volume file.

12. A data restoration apparatus, comprising:
a memory storing executable instructions; and
a processor coupled to the memory and configured to:
obtain a fixed-length volume file and a fixed-length volume bitmap file of a first target volume, wherein the first target volume is a to-be-restored volume, wherein the first target volume comprises multiple fixed-length volume files, wherein the fixed-length volume file and the fixed-length volume bitmap file are in one-to-one correspondence and are saved in association, wherein the fixed-length volume file is used to identify valid data that needs to be stored, and wherein the fixed-length volume bitmap file is used to identify a storage address of the valid data on a production end; and restore, according to the fixed-length volume file and the fixed-length volume bitmap file, data in the fixed-length volume file to the storage address that is on the production end and identified by the fixed-length volume bitmap file.

13. The data restoration apparatus according to claim 12, wherein the processor is further configured to obtain the fixed-length volume file and the fixed-length volume bitmap file according to a volume mapping file of the first target volume, and wherein the volume mapping file comprises at least a name of a fixed-length volume file of a fixed-length data block in the first target volume and a storage path of the fixed-length volume file.

14. The data restoration apparatus according to claim 13, wherein the volume mapping file further comprises a name of the fixed-length volume bitmap file corresponding to the fixed-length volume file.

* * * * *